(12) United States Patent
Witteveen et al.

(10) Patent No.: US 7,429,812 B2
(45) Date of Patent: Sep. 30, 2008

(54) DRIVE UNIT

(75) Inventors: Bonny Witteveen, Venlo (NL); Elmar Mock, Colombler (CH); Edwin Daamen, Born (NL); Florian Kaufmann, Solemum (CH)

(73) Assignee: Miniswys SA, Biel (CH)

( * ) Notice: Subject to any disclaimer, the term of this patent is extended or adjusted under 35 U.S.C. 154(b) by 0 days.

(21) Appl. No.: 11/643,297

(22) Filed: Dec. 21, 2006

(65) Prior Publication Data

US 2007/0164635 A1    Jul. 19, 2007

Related U.S. Application Data

(63) Continuation of application No. PCT/CH2005/000343, filed on Jun. 21, 2005.

(51) Int. Cl.
*H01L 41/04* (2006.01)
*H02N 2/00* (2006.01)

(52) U.S. Cl. .................. 310/323.01; 310/12; 310/15; 310/323.02

(58) Field of Classification Search ............ 310/311, 310/328, 367, 323.01, 323.02, 12–15
See application file for complete search history.

(56) References Cited

U.S. PATENT DOCUMENTS

| | | | |
|---|---|---|---|
| 6,150,750 A * | 11/2000 | Burov et al. ............ | 310/328 |
| 6,323,578 B1 | 11/2001 | Suzuki et al. | |
| 6,690,101 B2 | 2/2004 | Magnussen et al. | |
| 2003/0052575 A1 | 3/2003 | Mock et al. | |
| 2004/0095040 A1 | 5/2004 | Magnussen et al. | |
| 2004/0212794 A1 | 10/2004 | Mizuno | |

(Continued)

FOREIGN PATENT DOCUMENTS

EP    0 642 180 A2    3/1995

(Continued)

OTHER PUBLICATIONS

English translation of German language International Search Report (German language version submitted to U.S. Patent Office on Dec. 21, 2006) corresponding to PCT/CH2005/000343.

(Continued)

*Primary Examiner*—Jaydi A San Martin
(74) *Attorney, Agent, or Firm*—Frishauf, Holtz, Goodman & Chick, P.C.

(57) ABSTRACT

A drive unit for the movement of an active element with respect to a passive element, wherein the active element includes a resonator and at least one excitation device for exciting oscillations of the resonator. The resonator includes contact regions for exerting forces onto the passive element. The active element may be driven with respect to the passive element by way of oscillating movements. The resonator includes at least two arms, preferably a pair of arms. The at least two arms of an arm pair, proceeding from a connection region of the resonator, are formed on the same side of the resonator. In each case the contact regions are formed at the outer ends of the arms, wherein the contact regions may be moved to and away from one another by way of oscillating movements of the arm pair. Thereby, a relative movement of the passive element with respect to the active element may be effected.

69 Claims, 17 Drawing Sheets

U.S. PATENT DOCUMENTS

2005/0006983 A1    1/2005    Witteveen

FOREIGN PATENT DOCUMENTS

| EP | 1 137 054 A1 | 9/2001 |
| JP | 60074982 A | 4/1985 |
| JP | 62262676 A | 11/1987 |
| SU | 773715 A | 10/1980 |
| WO | WO 01/41228 A1 | 6/2001 |
| WO | WO 02/099844 A2 | 12/2002 |
| WO | WO 03/036786 A2 | 5/2003 |
| WO | WO 03/048831 A2 | 6/2003 |
| WO | WO 03/079462 A2 | 9/2003 |

OTHER PUBLICATIONS

PCT International Preliminary Search Report dated Jun. 24, 2004 (Form PCT/ISA/210).

* cited by examiner

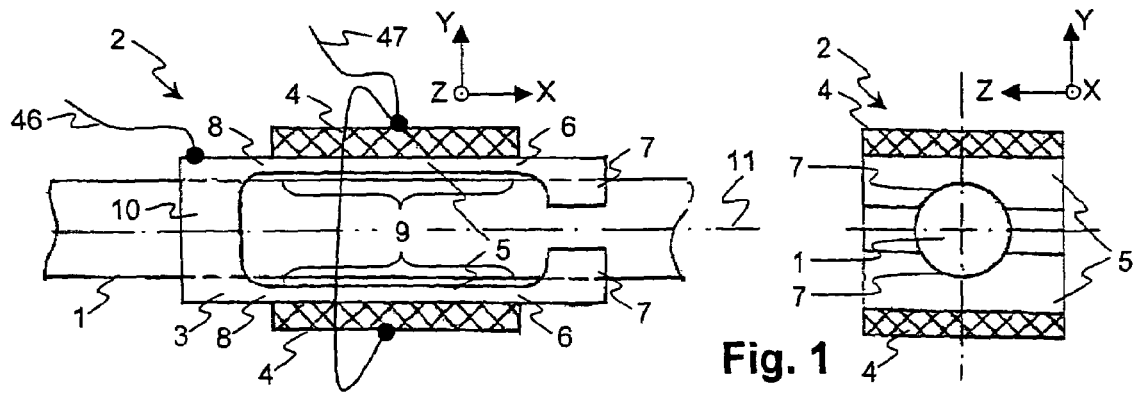
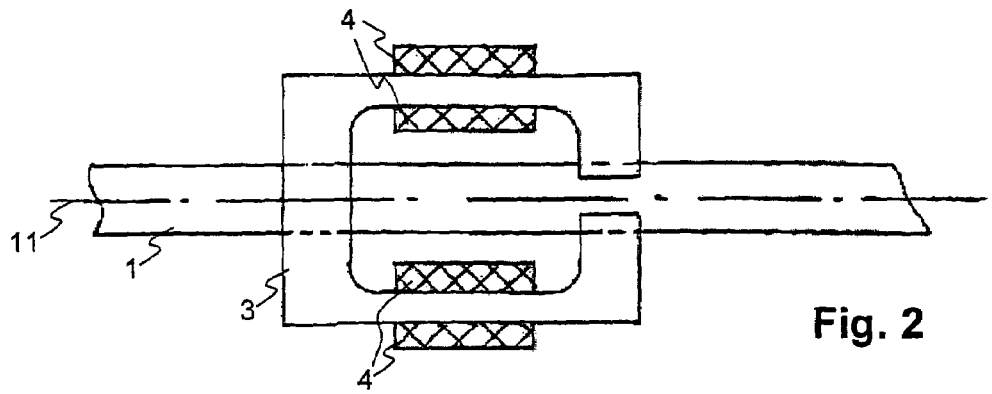
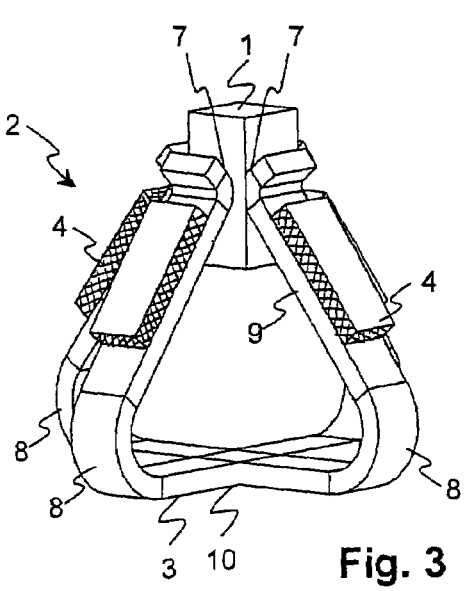
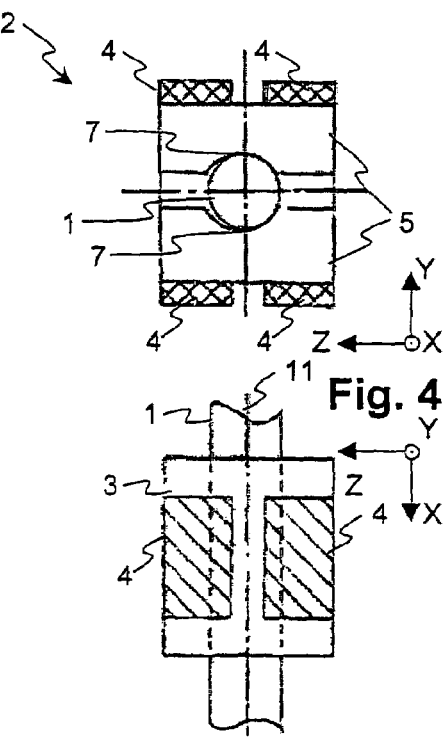
Fig. 1
Fig. 2
Fig. 3
Fig. 4

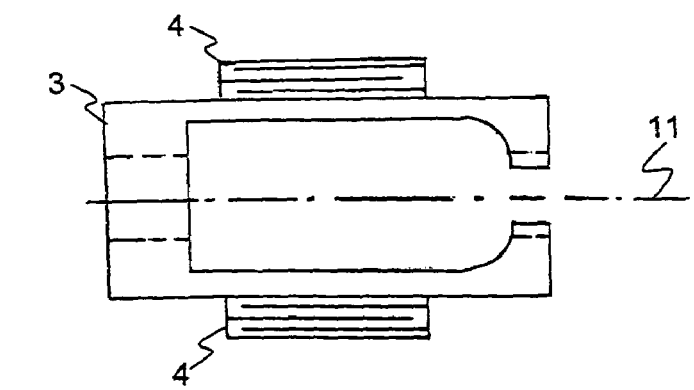
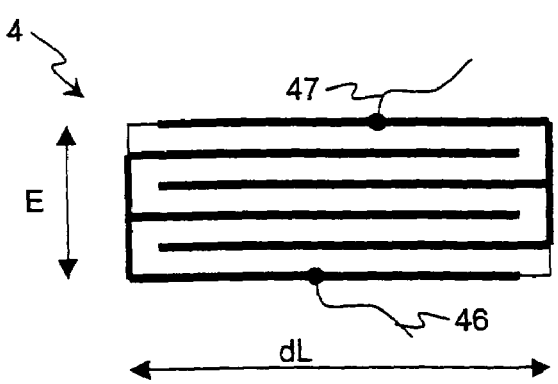
Fig. 13
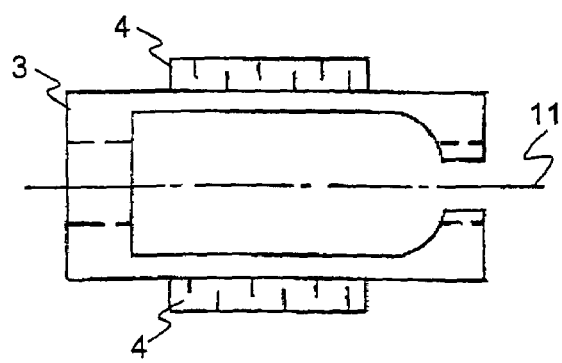
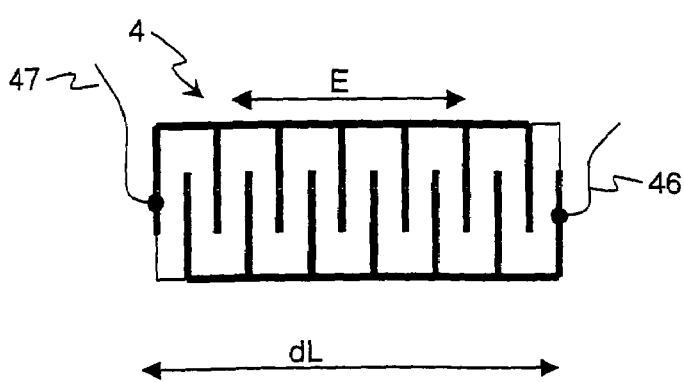
Fig. 14

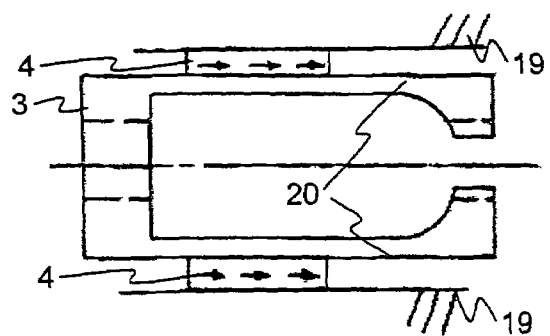
Fig. 15
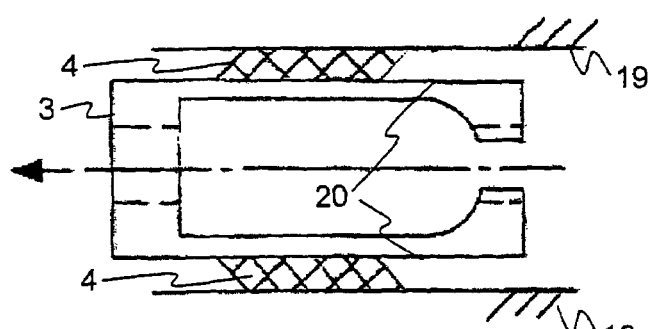
Fig. 16
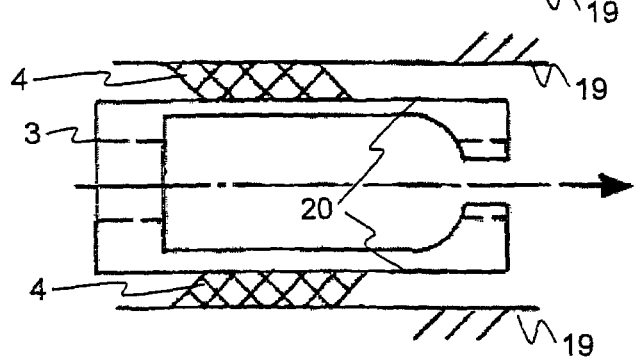
Fig. 17
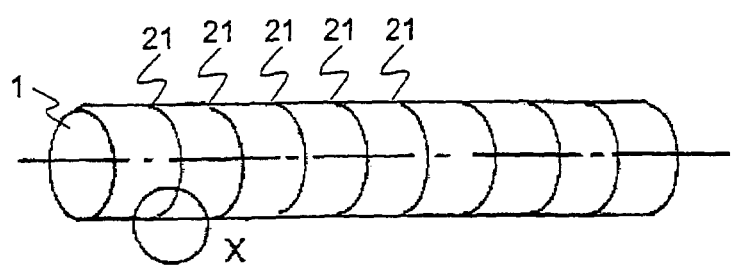
Fig. 18
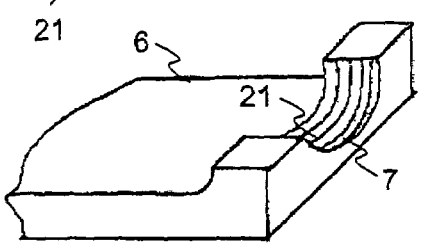
Fig. 19

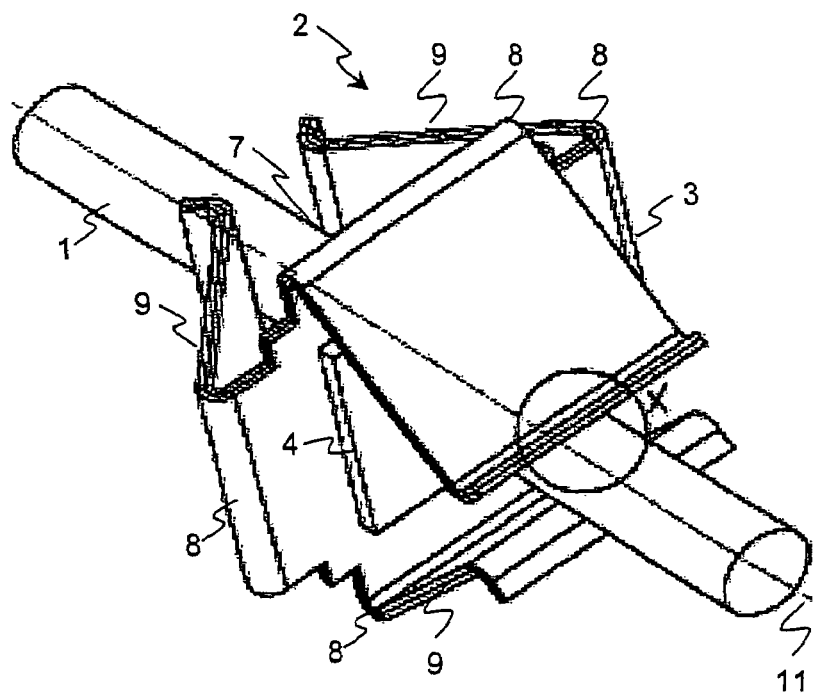
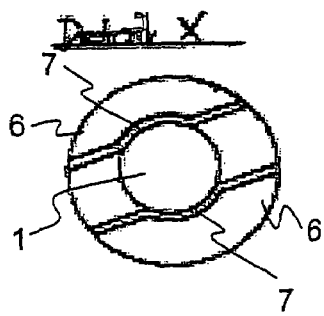
Fig. 24
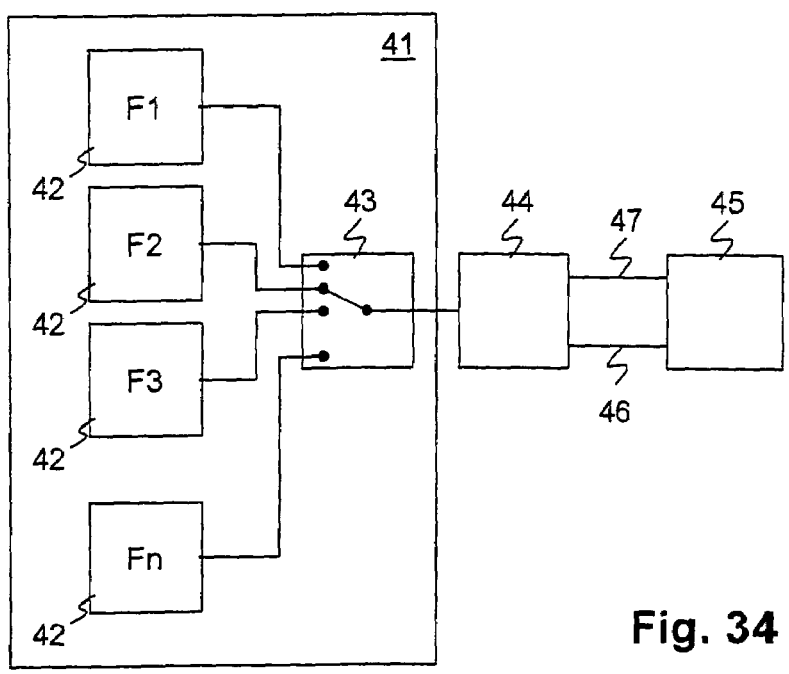
Fig. 34

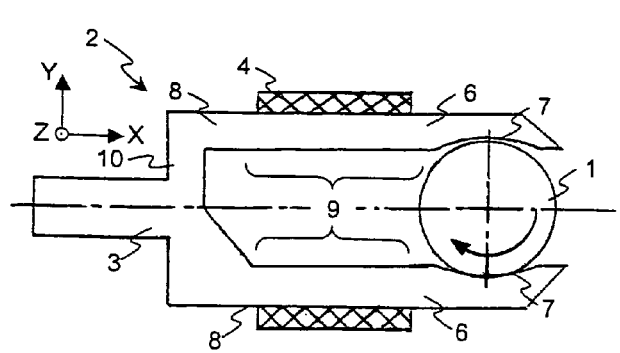
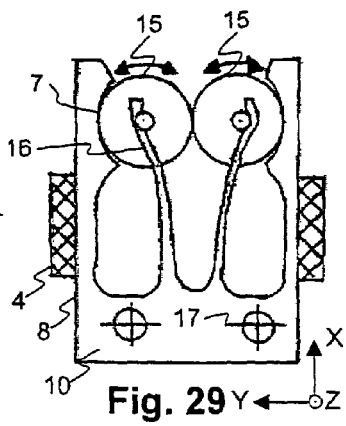
Fig. 28  Fig. 29
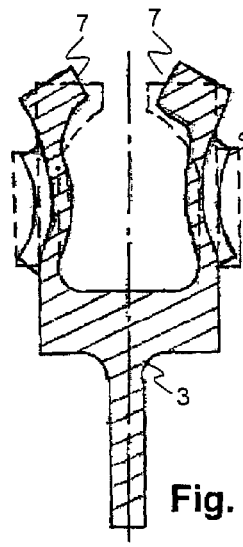
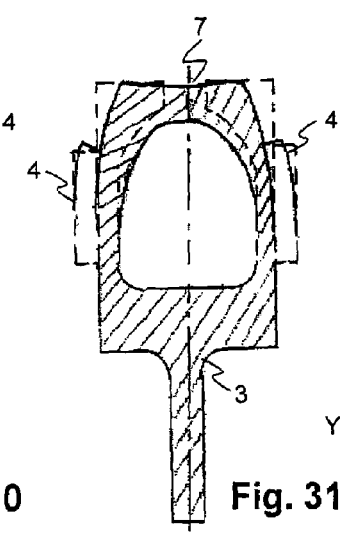
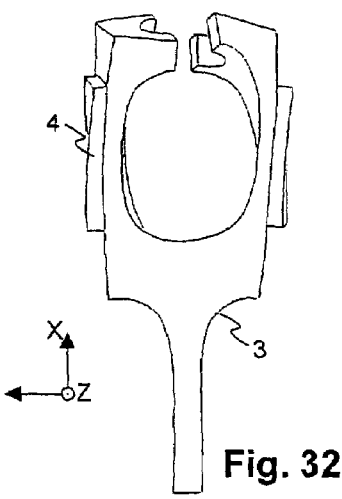
Fig. 30  Fig. 31  Fig. 32
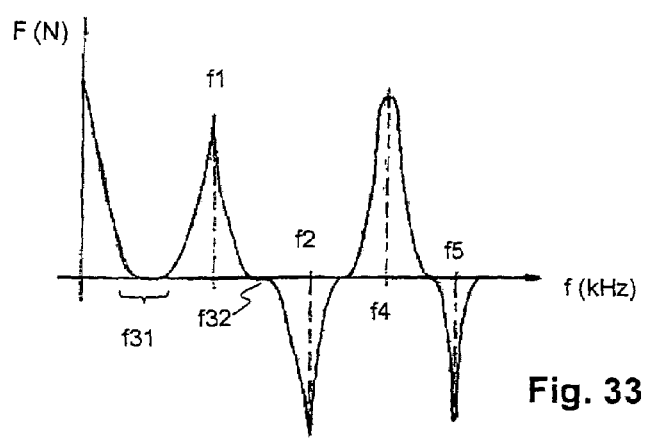
Fig. 33

DRIVE UNIT

CROSS-REFERENCE TO RELATED APPLICATIONS

This is a continuation of International Application PCT/CH2005/000343 filed Jun. 21, 2005, which claims priority of Swiss Patent Application Nos. CH 1066/04 filed Jun. 24, 2004 and CH 2167/04 filed Dec. 30, 2004, the entire contents of each of which are incorporated herein by reference.

FIELD OF THE INVENTION

The invention relates to the field of electrical drives, in particular piezoelectric drives. It relates to a drive unit, a drive method, a manufacturing method for manufacturing a part module for a drive unit, and a positioning unit for positioning an optical element, according to the preamble of the respective independent claims.

BACKGROUND INFORMATION

A piezoelectric motor is known from the document WO 01/041228, with which a drive element, consisting of a piezo-element and contact elements, is assembled in a flexible manner, and by way of this may be set into oscillations for the drive of a further body, by way of the contact elements.

WO 02/099 844 shows a drive in which a two-dimensional piezoelement excites a likewise flat resonator into oscillations which lie in the plane of the resonator or the piezoelement. A tapering continuation of the resonator lying in this plane is set into an oscillating movement parallel to this plane, and by way of this exerts a force onto a further body.

WO 03/036 786 shows a motor, with which the piezoelement is arranged on a central part of a resonator, and brings several arms arranged symmetrically about the central part, with drive regions, into oscillation.

WO 03/079 462 shows a piezodrive with advance elements, on which a sharp bend is shaped in each case, by which means they have two resonant frequencies. Depending on the excitation frequency, one contact region of an advance element oscillates along an elliptical path in the one or other direction, and effects a correspondingly directed force onto a further body. The excitation of the oscillations is effected by way of a flat piezoelement, and the movement of the contact regions runs parallel to this excitation plane.

U.S. Pat. No. 6,690,101 describes a piezodrive, with which a stack of piezoelements is held in the resonator by way of clamping. Further elements are required in order to position the resonator with the drive region with respect to a body to be driven.

U.S. Pat. No. 6,323,578 discloses a piezodrive with which several arms with drive regions act on the surface of a rotatable disk in the tangential direction. The arms in each case comprise piezoelements, which cause a movement of the respective arm tip (with a drive range) perpendicular to the plane of the piezoelement.

OBJECTS AND SUMMARY

It is an object of the invention to create a drive of the initially mentioned type, which has a simple design construction.

A further object of the invention is to provide a drive which is particularly well suitable for miniaturisation.

A further object of the invention is to provide a drive which is suitable for linear drives with a short as well as infinitely long, quasi endless travel.

A further object of the invention is to provide a drive which permits combined and/or alternating linear and rotatory movements.

A further object of the invention is to provide a drive which permits a design which is favourable with regard to manufacturing technology.

A further object of the invention is to provide a drive which permits a reliable contacting and force transmission by way of at least two, preferably four contact regions.

A further object of the invention is to provide a drive which permits a simple compensation of manufacturing inaccuracies with the drive or the driven parts.

These objects are achieved by a drive, a drive method, a manufacturing method for manufacturing a part module for a drive unit, and a positioning unit for positioning an optical element, with the features of the respective independent patent claims.

The drive according to the invention thus comprises a resonator which comprises at least two arms, preferably a pair of arms, wherein at least two arms, proceeding from a connection region of the resonator, are formed on the same side of the resonator. The contact regions are in each case formed at the outer ends of the arms, wherein the contact regions may be moved together or apart by way of oscillating movements of the arm pair, by which means a relative movement of the passive element with respect to the active element may be effected.

The active element is thus designed such that the two contact regions of an arm pair are formed in the manner of a tuning fork, and enclose a part of the passive element, or are enclosed by a part of the passive element. In the idle condition, the arms preferably have a biasing with respect to the passive element, and thus firmly hold this. The arms of one arm pair are preferably arranged symmetrically with respect to the passive element.

The oscillating movements of the arm pair correspond preferably to a fundamental oscillation mode of the arms, wherein the fundamental oscillation mode has the lowest frequency for the different oscillation modes of the active element.

If the passive element is firmly held, the active element thus forms a runner which may be moved in a translatory and/or rotatory manner. The runner is called an outer runner, if thereby the contact regions of one arm pair enclose a part of the passive element. If in contrast, the contact regions of one arm pair are enclosed by a part of the passive element, then the runner is called an inner runner. Thereby, the passive element may be a hollow profile or a tube. Conversely, the active element may of course also be considered as fixed with regard to a reference system, and the passive element as moving.

The resonator comprises two-dimensional sections. Individual sections of these are formed more thickly and/or are provided with a preferably likewise two-dimensional excitation means, and are stiffer than other sections by way of this. These other sections may act as bending- or spring regions on account of this. An arm is preferably connected to the rest of the resonator in each case via such a spring region. The spring region and the adjacent sections of the arm are preferably formed as one piece; thus the spring region is formed integrated on the arm or on the resonator. The spring region extends along a straight boundary of a connecting flat section. The direction of this straight boundary corresponds to a preferred bending axis of the spring region. Thus the arm has a preferred fundamental oscillation mode corresponding to this bending axis, with which individual material points of the arm move in each case in a plane (hereinafter called fundamental oscillation plane), which lies perpendicular to the plane of the arm or its flat section, as well as also perpendicularly to the bending axis. The outer ends of the arm thereby oscillate towards one another and away from one another. A natural frequency or fundamental frequency according to this mode results from the stiffness of the spring region and the mass distribution on the oscillating part of the arm. The fundamental frequency of the arm as a whole—observed over all oscillation modes—is the lowest frequency at which the arm may oscillate. This corresponds to the fundamental oscillation, which with flat arms is typically a bending oscillation.

The fundamental oscillation planes lie typically either parallel, but also at an angle to a plane of an excitation means, preferably perpendicularly thereto, as will become evident from the following.

One or more of the flat sections are provided with excitation means for exciting the oscillations. In each case, an individual excitation means may be attached on both arms of an arm pair, or only a single excitation means may be attached on the resonator, preferably on a connection region between the arms.

The excitation means in a preferred embodiment of the invention are piezoelements, or however of a magnetostrictive material. The excitation means are preferably essentially flat, in particular plane, and in each case are attached on a likewise flat or plane region of the resonator, for example by way of bonding, on-growth of piezocrystals, or by way of LIGA technology. The excitation means are configured in a manner such that they excite movements parallel to their plane. Thereby, a bending of both elements, thus of the excitation means and of the flat section is effected on account of the cooperation with the resonator, in particular at a connection surface such as the flat section. The two elements form a bimorphous exciter, thus an exciter consisting of two elements with different material properties—for example a piezoelement and a non-piezo element.

The oscillation characteristics of the system of the resonator and excitation means change compared to the resonator on its own, depending on the stiffness and mass of the excitation means. The interaction with the passive element has a further influence: A free oscillation is damped depending on the hardness, biasing, friction coefficient, surface nature, etc. Basically the natural frequency of the active element in contact with a passive element is slightly higher than with an undamped oscillation.

In a preferred embodiment of the invention, a piezoelement fastened on an arm or limb is a monolayer- or multilayer element which is operated in the d31-mode. Thereby, one polarisation direction of the piezoelement lies perpendicularly to the plane of the arm or its flat section, and the electrodes on the piezoelement run parallel to the plane of the arm. In the d31-mode (also called transversal mode), the main movement direction of the piezoelement lies perpendicularly to the direction of the applied voltage. Conversely, also one or more elements layered onto one another may be operated in the d33-mode, wherein the polarisation direction runs parallel to the plane of the arm, and the electrodes perpendicularly to the plane of the arm. In the d33-mode (also called longitudinal mode), the main movement direction of the piezoelement runs parallel to the direction of the applied voltage. In both cases, the piezoelement shortens or extends on applying an alternating voltage, bends and/or extends and/or twists the arm at the corresponding plane section and brings the arm or the resonator as a whole into oscillation.

Basically, an individual piezocrystal may be replaced by a multi-layer piezo in all embodiments. One may operate with lower voltages with this, but multilayer piezos are more difficult to manufacture and are more expensive on account of this.

The arms in each case have an asymmetrical mass distribution preferably at the free end, for example on account of the arm being bent towards the passive element, or having a projecting attachment projection in the direction of the passive element. With the stretching of the arm, on account of the acceleration of this asymmetrical mass lying outside the plane on which the piezoelement is attached, this mass is also moved towards the passive element or away from this. This movement is superimposed on the above-described bending movement or the bimorphous effect.

With the continuous excitation of the excitation means, oscillations occur at the end of the arm parallel as well as also perpendicularly to the plane of the arm. These oscillations have different phase positions to one another depending on the frequency of excitation. On operation without the passive element and depending on the phase position, the end of the arm, and in particular a contact region at the end of the arm, executes an approximately elliptical movement with a positive or negative rotational direction. With the presence of the passive element, the elliptical movement is limited by the passive element, and the passive element is driven in the one or other direction depending on the excitation frequency. An amplitude of the movement for example lies in the range below one micrometer or below 0.1 micrometers.

The description of the movement as elliptical, as a rule is a simplification: different material points of the contact regions move along different trajectories, which for example may also run in a kidney-like manner. On contact with the passive element, a trajectory may have discontinuous sections, with which the contact regions push the passive element or knock against the passive element several times.

The oscillation often does not run exactly in a plane, on account of further asymmetries of the resonator per se, on account of the mutual arrangement of resonator(s) and excitation means, and/or on account of the interaction with further parts. It is therefore a three-dimensional oscillation of individual material points, and the roughly elliptical movement is visible with the projection onto a plane by a tangent to a desired movement in the region of the contacting. The desired movement is mostly given by a guiding of the passive element with respect to the active element. In each case, the movement components (seen vectorially) become mechanically effective, which on contact of the contact regions with the passive element, run in an allowable direction according to the guiding.

Thus a force effect is produced outside the arm planes. For this reason, it is possible to arrange the flat sections of an arm pair and thus also the corresponding excitation means parallel to one another. A very space-saving construction becomes possible by way of this.

In an idle condition, the contact regions of one arm pair execute biasing forces with respect to the passive element, which counteract one another, and firmly hold the passive element by way of this. Thereby, a non-positive fit via the active and the passive element is present, with which no further parts or mountings participate. The forces and moments between the resonator and the passive element mutually cancel one another out given a standstill.

In a further preferred embodiment of the invention, the resonator and/or the excitation means are designed in a manner such that not only oscillations in the fundamental oscillation planes are able to be excited, as described above, but also oscillations which run approximately perpendicular thereto. This is effected by way of the design of asymmetrical features within the plane, in each case of one arm, for example by way of

- arranging several excitation means next to one another on the same flat section and activating them in a different manner, and/or
- the arm having at least one lateral incision, thus with a section plane perpendicular to the arm plane and transverse to the longitudinal direction of the arm, and/or
- the arm, in the plane of the arm, thus on observation perpendicular to the plane of the arm, having an asymmetrical indentation and/or an asymmetrical projection in the region of the free end of the arm.

Each of these measures leads to the movement of the free end of the arm also having components in the direction perpendicular to the fundamental oscillation plane, given a suitable excitation frequency. With a corresponding symmetrical design of two arms of an arm pair which lie opposite one another, the two contact regions execute movements which oscillate essentially symmetrically to one another. Thereby, the passive element is preferably rotationally symmetrical and its axis of symmetry which is identical to the movement axis, runs in the direction of the longitudinal axis of the arm pair. The passive element is set into a rotation about its axis with respect to the arm pair or the active element by way of the described movement of the contact regions. Thereby, the force components do not cancel in a plane orthogonal to the movement axis, but increase the movement.

In a simplified variant of the just described embodiment, the active element comprises two flat, for example rectangular arms which are fastened parallel to one another and on opposite sides of a preferably flat excitation means. The excitation means for the production of oscillations is arranged essentially parallel to the plane of the arms. For example, for this, a piezoelement is supplied via the connection surfaces to the arms, and operated in d31 mode, so that it oscillates mainly parallel to these connection surfaces. By way of this, oscillations are exited above all in the plane of the arm. But even if no specially designed asymmetries as described above are present, then oscillations also occur perpendicularly to the arm plane. By way of systematically varying the excitation frequency, and by way of experiment or computational analysis by way of FEM models, one may find a combination of oscillation modes which effects a resulting drive force on a passive element, said force lying parallel to the plane of the two arms. This movement may, depending on the frequency, lie in such a plane in the main extension direction of the arms, but also perpendicularly or at an angle to the main direction of extension.

A translatory as well as rotatory relative movement of the active with respect to the passive element is possible with a rotational-cylindrical passive element. One may excite different oscillation modes with an arm design as described above, by way of a suitable choice of the excitation frequency. Depending on the oscillation mode

- the translatory effective movements of the arms or corresponding forces on the passive element are increased, and the rotatory acting forces cancel out momentarily or in the temporal average, or
- the rotatory active movements of the arms increase, and the translatory acting forces cancel out momentarily or in the temporal average, or
- the translatory as well as the rotatory active movements of the arm increase, or
- the arms neither execute a translatory nor a rotatory effective total force, momentarily or in the temporal average.

Accordingly, a translatory or a rotatory or a combined helical movement arises. The passive and the active element may be moved relative to one another in a loose manner in the later case.

In a preferred embodiment of the invention, one main axis of the passive element coincides with the axis of symmetry of the active element. Preferably, the active element in a connection region between the at least two arms further comprises a breakthrough or an opening for receiving the passive element. The active element is thus mounted with respect to the passive element, on the one hand by this opening and on the other hand by the contact regions of at least one arm pair, and no further mounting elements, guide element or holding elements are necessary.

In a preferred embodiment of the invention, the passive element comprises at least one rotation-cylinder-shaped body, whose cylinder axis defines a movement axis, and the movement axis runs perpendicular to an axis of symmetry of the at least one arm pair.

In a first variant of this embodiment, the passive element comprises a rotation-cylinder-shaped body which is arranged between the at least one arm pair, and contacts this at contact regions which lie opposite one another with respect to the cylinder cross section. The passive element is driven by equi-directional rotations of the contact regions.

In a second variant of this embodiment, the passive element comprises two rotation-cylinder-shaped bodies, which are arranged between the at least one arm pair. In each case, one of the two bodies contacts in each case one of the arms of the at least one arm pair at a contact region of this, and the two rotation-cylinder-shaped bodies are pressed against one another by these arms, and may be rotated with opposite rotational directions. The two cylinders are driven by opposite rotations of the contact regions.

In a further group of preferred embodiments of the invention, the planes of the arms are essentially parallel to one another and to the excitation means. The movement components of oscillations of the contact regions which are also effective for the drive, preferably also run essentially in a plane parallel to the plane of the arms. Thus a particularly flat design is possible, and the resonator may preferably consist of a single flat or arcuate part, for example from a punched-out sheet metal piece. In this embodiment of the invention, a movement axis of the relative movement between the active element and the passive element runs parallel to the mentioned plane of the arms and preferably also of the connection region.

However, the movement components of oscillations of the contact regions, which are effective for the drive, may also run essentially in a plane perpendicular to the plane of the arms. A further preferred embodiment of the invention therefore comprises a passive element whose movement direction runs essentially perpendicular to the main extension direction of two elongate, flat arms of the active element, and at an angle thereto, preferably at least approximately perpendicular to the arm planes. Here too, the resonator is preferably formed of a flat sheet metal part, and one arm pair or the arm plane and the connection region lie in the same plane.

The resonator is preferably manufactured as one piece and for example by way of milling, electro-erosion, shape punching and bending, shape sintering of powdered material, etc. A metal is preferably selected for the resonator, for example steel, aluminium, titanium phosphor-bronze, beryllium-copper etc., or a ceramic material. A metallic resonator is preferably provided at the contact regions with a ceramic hard layer, for example of a titanium nitride, or provided with a ceramic body.

The resonator material is selected according to the following criteria:
- a high Q-factor, i.e. little internal damping,
- a good coupling factor, so that the dynamic energy of the piezo may be transmitted to the oscillator,
- electrically conductive, since the resonator as a rule serves as an electrical connection for one or more piezoelements,
- ideal friction partner to the passive element,
- industrially shapeable,
- inexpensive.

The passive element is preferably manufactured of one of the mentioned materials. Since it does not need to have certain oscillation characteristics, it may however also consist of a plastic or a plastic composite material, for example of a plastic to which glass or ceramic is added.

The demands on the passive material are the following:
- ideal friction partner to the resonator, which means maximal friction coefficient with minimal abrasion,
- optimal damping of the resonator at the contact point, so that the elliptical movement may be converted into a forward drive.

The surface of the passive element as well as of the active element is preferably hardened, for example by way of rolling, nitriding, hardening & tempering, etc. Preferably, the surface of the contact partner which is larger with regard to area, typically of the passive element, is polished, whereas the surface of the contact partner which is smaller with regard to area, typically of the active element, is roughened or structured.

The resonator of the drive according to the invention, in another preferred embodiment of the invention is manufactured from a two-dimensional sheet metal piece by way of sheet metal forming and bending. For this, for example two ends of a single elongate sheet metal piece are bend relative to one another, so that they run parallel to one another and form an arm pair. Preferably, tabs projecting laterally on the arms are bend towards the respective opposite arm and connected to this. A stiffening of the arm pair in the connection part may be achieved without further parts by way of this. In another variant of the invention, two essentially symmetrical sheet metal parts are bent into flat arms running in the same direction and parallel to one another at locations, and in the connection region are fastened directly onto one another or on a third body.

In a preferred embodiment of the invention, the drive comprises an arm pair which acts on the passive element, and the resonator comprises at least one flat section, wherein the at least one excitation means is attached on the at least one flat section, the at least one excitation means according to its planarity defines a plane of the at least one excitation means, and the arms are likewise formed in a two-dimensional manner, and the surface of the arms runs essentially parallel to the flat section and to the excitation means It is thus possible to form an extremely flat linear drive, wherein the movement directions of the passive element may lie in the plane of the surface of the drive, perpendicularly or at an angle to this surface.

In another preferred embodiment of the invention, the drive comprises an arm pair which acts on the passive element, and the resonator comprises at least one flat section, wherein the at least one excitation means is attached on the at least one flat section, the at least one excitation means according to its planarity defines a plane of the at least one excitation means, and wherein the drive-effective components of a movement of individual material points of the contact regions run essentially parallel to the flat section and to the excitation means.

It is thus possible to form a flat linear drive with a limited travel, whose movement direction lies in the plane of the surface of the drive.

In another preferred embodiment of the invention, the drive comprises an arm pair which acts on the passive element, and the resonator comprises at least one flat section, wherein the at least one excitation means is attached on the at least one flat section, the at least one excitation means according to its planarity defines a plane of the at least one excitation means, and wherein the drive-effective components of a movement of individual material points of the contact regions run at an angle, in particular perpendicular to a plane of the flat section or of the excitation means.

It is thus possible to form a flat linear drive with an extremely simple construction and an essentially unlimited travel with this.

In another preferred embodiment of the invention, the drive comprises at least two arms acting counter to one another via the passive element, wherein the resonator is formed of a single flat or regionally arcuate part with an essentially constant thickness.

It is thus possible to form a flat drive with an extremely simple construction with which the resonator for example consists of a single punched-out sheet metal piece, on which the excitation means is attached, and which encompasses the passive element and/or is encompassed by this.

In a preferred variant of the previously mentioned embodiments, the passive element and the active element are resiliently connected to one another via a base body and a driven body. The passive element thus as a whole is resiliently arranged with respect to the active element. Inaccuracies during manufacture, or displacements between the base body and the driven body on operation may be compensated by way of this resilient connection. The resilient connection may be formed on the active element or on the passive element or on both, and is preferably formed as one piece with a part of this element.

The resilient mounting of the active element leads from the base body preferably to an oscillation node of oscillation modes of the resonator which are used on operation, so that the oscillation is possible in an unhindered manner and with little loss in energy. The region at which the mounting is connected to the resonator, for example lies at the middle of the surface of the excitation means or at the middle of one side of the excitation means.

With the mounting in the region of the middle of the excitation means, the mounting preferably consists of a section of the resonator sheet metal part which is bent out of the plane of the resonator and leads to a base element for fastening on the base body. The base element, the mounting and the resonator are thus preferably designed as one piece.

In further preferred embodiments of the invention, the passive element is designed resilient per se. This means that a first element of the passive element, which contacts a contact region of a first arm of the active element, and a second element of the passive element which contacts a contact region of a second arm of the active element, are arranged resiliently with respect to one another. The contacting of the contact regions is improved with this, and wear of the contact regions and of the mentioned elements on the passive element are compensated.

In a further preferred embodiment of the invention, the passive element has a spring constant which is more than 100 or over 1000 times smaller than the resonator, with respect to a movement in the region of the contact regions within the plane of the resonator and essentially perpendicular to the movement axis.

The passive element is designed as one piece, or however preferably of several parts. Thereby, it comprises at least two contact regions for transmitting drive forces from the contact regions onto the driven body, as well as at least one spring element which presses the contact elements in opposite directions against the contact region.

In a further preferred embodiment of the invention, the passive element is resiliently connected to the driven body, and this resilient connection is preferably formed as one piece with a contact plate of the passive element for accommodating drive forces. Preferably thereby, the resilient connection is rigid in one direction for transmitting drive forces, and is compliant in directions orthogonal thereto. Thus inaccuracies in this region may also be compensated, and nevertheless, a precise transmission of movement onto the driven body is possible by way of the selective stiffness of the connection. The driven body and/or further elements of the drive comprise a limitation of movements of the resilient connection for avoiding damage with impacts.

The movement direction of the relative movement between the active and the passive element does not necessarily need to be effected in the direction of the plane of the sheet metal parts, but may also run at an angle to this plane and even perpendicularly thereto. Preferably, a movement of the passive element is limited to a given translatory or rotatory dimension by way of guide means. The movement direction is thus limited or defined by way of the guide means. In each case, it is those movement components of the active element in the contact region, which run along the defined dimension, which contribute to the movement.

In a further preferred embodiment of the invention, the drive comprises at least two resonators with at least two arm pairs which are arranged next to one another, preferably parallel to one another, and which act on the same passive element. With this, one may achieve a greater drive force, and one may ensure an improved reliability of the drive. Preferably, at least one flat excitation means is arranged between two resonators arranged parallel to one another, for exciting oscillations of the two resonators. At least one of the resonators preferably has an electrically conductive mounting for the electrical contacting of the excitation means with at least one base element. The conductive mounting and the resonator are preferably designed as one piece. Thus a simple sandwich-like construction of the active element is possible, and connection wires and their bonding may be eliminated thanks to the conductive mounting(s), since the contacting is effected at a location of the resonator sheet metal part which is not moved.

The drive preferably has at least one intermediate electrode for the electrical contacting of the excitation means, wherein at least two excitation means are arranged between in each case two of the resonators, and an intermediate electrode in each case between two excitation means. With this, it is possible to operate the at least two resonators at the same electrical potential, so that electrically conductive, passive elements may be used. Otherwise, the passive element consists of an electrically insulating material, and the at least two resonators are electrically insulated from one another.

Preferably, a base element of sheet metal is allocated or integrally formed to or on each of the resonators, for the electrical contacting between two of the resonators, and at least one of the base elements is bent towards the other base element for the electrical contact of this.

The following embodiments of passive elements are preferred with the use of two or more resonators which are arranged in parallel and in each case are effective via an arm pair:

Preferably, the passive element comprises at least two contact plates, wherein each of the contact plates may be driven by contact regions of arms lying next to one another. The two contact plates are preferably pressed by a spring element against the contact regions, and the contact plates may be twisted by the spring element for compensating inaccuracies.

Since the passive element is arranged between the arms of the active element, the spring for example pulls the contact plates of the contact elements apart. The engagement points of the spring force, seen in the movement direction, lie in the middle of the contact plates. The contact plates thereby are also rotatable about an axis parallel to the movement direction, for which the holding arms have a small stiffness with respect to this rotation. Thus the two contact plates at both sides are pressed against the contact regions of the two resonators, and a contact at all four contact regions takes place. The mechanical contacting is improved by way of this, and with it, the drive force and life duration of the drive.

Another variant for improving the contacting of the contact regions lies in the contact regions being outwardly or inwardly bent about an axis perpendicular to the connection line between the contact regions which contact this contact plate. A self-centring and compensating movement of the contact plates with respect to the contact regions results on account of this.

The manufacture of a drive according to the invention is very simple on account of the use to the most part of flat parts: essentially the flat components need to be stacked on one another and connected. The connection may mostly be an electrically conductive one: parts which are to electrically and galvanically contact one another are connected, or a conductor is connected to an insulator, wherein it is only the mechanical fastening which is of significance. For this reason, one preferably uses an electrically conductive adhesive, in particular with an anisotropic conductivity, which thus only conducts in certain directions and at certain locations depending on the manner of processing. Such an adhesive for example is an epoxy adhesive with embedded metal balls, preferably of a standardised size. The curing of the adhesive is effected under pressure, so that the nickel balls contact the conductor to be connected, at both sides. The conductors are permanently pulled against one another due to the contraction of the adhesive during the curing. As an alternative to this, one may also apply a conductive adhesive, as the case may be, surrounded by insulating adhesive. It is also possible to bond and/or rivet the resonators onto a central plastic part from both sides.

The resonator sheet metal pieces may be bent towards one another in the region of the base elements, and be mechanically as well as electrically connected to one another. It is also possible to form the two resonators from a single sheet metal part, which is bent around the excitation means in a U-shaped manner, or into which the excitation means are inserted.

In a further preferred embodiment of the invention, the first resonator is not completely punched-out, but is conveyed further as a part of a punching strip, and the individual parts are applied onto the punching strip on assembly, connected to one another and conveyed further with the punching strip.

A combination of the following measures is to be preferred for minimising the drive energy and also the required voltage
    an as thin as possible adhesive layer between resonators and piezos and the intermediate electrode,
    resonators which are as equal as possible, i.e. the same shape, the same punching tool, the same batch of base material (sheet metal), so that the frequencies of the applied oscillation modes lie close to one another for both resonators;

flexible transition region between the intermediate electrode and its electrical connection;

mounting of the resonator at an oscillation node of relevant oscillation modes.

The feed voltage for the motor may be reduced for example from 80 V to less than 2.8 V and even less than 2 V with all these measures. On account of this, one may operate with low voltages as are specified in battery-operated apparatus, without the use of expensive multilayer piezos.

The modulus of elasticity of the adhesive and, as the case may be, of the plastic carrier element is much smaller than that of the piezo and of the resonator of metal or ceramic. Thus these comparatively compliant parts have a small effect on the oscillation, but absorb energy.

The drive according to the invention is small—its length lies in the range of 1 to 2 centimetres, or even less—is light, industrially manufacturable, and inexpensive, and permits a controlled movement with very small micro-steps. It is furthermore very robust on account of its simple construction.

The drive according to the invention is particularly suitable for miniaturised applications, for example as a linear actuator for optical focussing-, zoom- and aperture devices. As a rule, it is optical applications which are advantageous, since the passive element may be designed in a transparent or hollow manner. This permits the light waves to be led through directly in the axis of symmetry of the drive. Applications with glass-fibre cables, the adjustment of focus points, optical waveguides for pointers, etc. are for example advantageous.

A positioning unit for positioning an optical element according to the invention comprises: a base body and a holder displaceable thereto, said holder carrying the optical element, wherein the positioning unit has a drive unit according to the invention. Thereby, the active element is preferably fastened on the base body, and the passive element on the holder.

Further preferred applications are positioning systems such as XY-tables, as well as micro-manipulators for handling and influencing small objects.

The drive is also preferably applied in the field of automobiles, for example as a drive of dials or air flaps, on account of its robustness.

Further preferred embodiments are to be deduced from the dependent patent claims.

BRIEF DESCRIPTION OF THE DRAWINGS

The subject-matter of the invention is hereinafter described in more detail by way of preferred embodiment examples which are represented in the attached drawings. In each case and in a schematic manner there are shown in:

FIG. 1 a drive according to the invention, in a lateral view and a view in the direction of a movement axis;

FIG. 2 a drive with in each case two piezoelements per arm;

FIG. 3 a drive with two arm pairs pointing in the same direction;

FIG. 4 a drive each with two piezoelements per arm which are arranged next to one another in the same plane, in a plan view and a view in the direction of the movement axis;

FIG. 13 a piezomotor with piezoelements in d31-mode, and a contacting of such piezoelements;

FIG. 14 a piezomotor with piezoelements in the d33 mode, and a contacting of such piezoelements;

FIG. 15 a piezomotor with piezoelements in d15-mode;

FIGS. 16 and 17 a piezomotor according to FIG. 15, in different movement conditions;

FIG. 18 an advantageous design of a passive element;

FIGS. 19 and 20 advantageous designs of an active element;

FIG. 24 a drive with two arm pairs, which point in opposite directions;

FIG. 28 a drive with a cylinder as a passive element, which is arranged perpendicular to the axis of symmetry of an arm pair;

FIG. 29 a drive with which the passive element comprises two cylinders rotatable in opposite directions;

FIGS. 30 to 32 different oscillation modes of an active element according to FIG. 1;

FIG. 33 a course of drive forces or moments, in dependence on an activation frequency;

FIG. 34 a block diagram of a circuit for activating a piezomotor;

The reference numerals used in the drawings, and their significance are listed conclusively in the list of reference numerals. Basically, equal parts are provided with the same reference numerals in the figures.

DETAILED DESCRIPTION OF THE PREFERRED EMBODIMENTS

Figure 5:
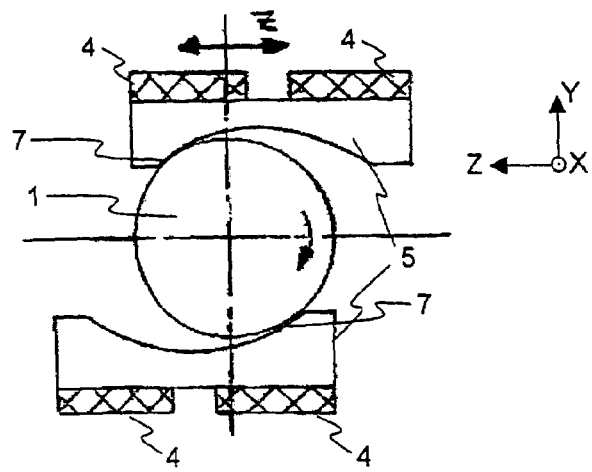
FIG. 5 a movement mode of a motor according to FIG. 4, for exciting a rotation movement, FIG. 6 a drive with an asymmetry in the plane of the arms.

FIG. 1 shows a drive according to the invention, in a lateral view and a view in the direction of a movement axis 11. The drive comprises a passive element 1 which is enclosed by an active element 2. The active element 2 comprises a resonator 3 with an arm pair 5 of two arms 6 which are connected to one another via a connection region 10. The arms 6 are shaped essentially symmetrically to one another, similar to a tuning fork. The active element 2 further comprises two excitation means 4 of which in each case one is fastened on a flat section 9 of an arm 6, for example by way of bonding.

The adhesive comprises preferably the following properties: good energy transmission from the piezoelement 4 to the resonator 3, a constant thickness and electrical conductivity, so that the bonded electrode may be contacted, for example amid the additional of silver epoxy or of electrically conductive microscopic metal balls, for example of nickel. Furthermore: rapid curing ability, thermally stable, low in fatigue, easily meterable The bonding permits the compensation of manufacturing inaccuracies between the resonator 3 and the excitation means 4.

Apart from bonding technology, there is also the possibility of depositing the ceramic piezoelement directly onto a resonator and letting is "grow", until it has reached the desired thickness. This has the advantage that no bonding operation needs to be carried out, and that no shear losses in the bonding layer occur.

On the other hand, metal may also be deposited on the piezoelement 4 with galvano-technical means, in particular by way of LIGA technology, or by way of diffusion bonding or soldering.

Contact regions 7 are located at the free ends of the arms 6. The contact regions 7 lie opposite one another with respect to an axis of symmetry of the arm pair 5. The passive element 1 is clamped in by way of the arms 6 at the contact regions 7, in an idle condition without excitation of the excitation means 4. The passive element 1 in this embodiment is a round rod, thus is shaped in a rotationally cylindrical manner. The contact regions 7 of the arms 6 are preferably shaped similarly to the shape of the passive element 1. With a rotationally cylindrical passive element 1, the contact regions 7 are concave and this concave shape has a weaker curvature than that at the periphery of the passive element 1. The active element 2 or the resonator 3 at the connection region 10 comprises an opening 14 corresponding to the shape of the passive element 1, through which opening 14 the passive element 1 is led. The active element 2 is thus displaceable along the passive element 1 in the direction of the movement axis, and is also rotatable about the movement axis.

The direction of the movement axis is indicated as an X-direction, a direction running perpendicular thereto and perpendicular to the plane of the limbs as a Y-direction, and a direction running perpendicularly to the X- and Y-direction as the Z-direction.

Each of the arms 6 comprises a flat, plane section 9 which in each case is arranged between the connection region 10 and the free end of the arm 6 with the contact region 7. The flat sections 9 extend in the XZ-plane and are parallel to one another. The flat section 9 of each arm is connected to the connection region 10 via a spring region 8, and is thus movable with respect to the connection region 10 about a bending axis running in the Z-direction. The flat section 9 itself is stiffened by the excitation means 4, and is therefore mainly essentially deformable when the excitation means 4 is excited. Otherwise the arm 6 may oscillate with respect to the connection region 10 at the spring region 8. This corresponds to a fundamental oscillation of the arm. Thereby, the individual material points of the arms 6 in each case move in planes parallel to the XY-plane, which in the following is called the fundamental oscillation plane.

The excitation means 4 are preferably likewise flat and are arranged parallel on the correspondingly flat sections 9. The excitation means 4 are preferably piezoelements, and are polarised perpendicular to the plane of the excitation means 4 or of the respective flat section 9. The piezoelements comprise electrical connections at the surfaces running parallel to the main plane of the flat section 9 or of the piezoelement 4, in order to be operated in the d31 mode. With the d31-mode, the extension direction of the piezoelement runs perpendicularly to the applied electrical field. Piezoelements may also be designed as multilayer elements.

The piezoelements 4 are preferably connected electrically in parallel, wherein for example the resonator 3 forms an electrical connection to a common first connection 46, and the outer-lying electrodes of the two piezoelements 4 are connected to one another and to a second connection 47. The two connections are connected to a driver circuit as is schematically represented in FIG. 33, and described further below. The electrical connection leads 46, 47 are not draw in the further figures for the sake of clarity.

FIGS. 30 to 32 show different oscillation modes of an active element similar to that of FIG. 1, wherein however the connection region 10 does not comprise an opening 14 but a central mounting. In the modes according to FIGS. 30 and 31, material points oscillate essentially in fundamental oscillation planes and for this reason a cross-sectional drawing is adequate for representation. The moving sections of the arms 6 are in each case symmetrical per se in the idle condition in the flat section 9, thus here are essentially parallelepiped. Each of the arms 6 at the free ends, has a section which is shaped in an asymmetrical manner with respect to the flat section 9, seen in the Z-direction. Here, this is a formed-out region perpendicular to the plane of the flat section 9, thus in the Y-direction, which forms the contact region 7. The formed-out region is inwardly directed in the figures, towards the passive element 1. As an alternative to this or also additionally to this, it may also be directly outwardly.

With an extension or shortening of the arm 6 in the XZ-plane by way of excitation of the piezoelement 4, the formed-out region perpendicularly to this plane, on account of its mass inertia, effects a twisting of the formed-out region about the Z-direction, and a lifting or pressing of the contact region 7 in the Y-direction. Superimposed on this movement is a bimorphous effect, thus a curvature of the arm 6 on account of the different extension of the piezoelement 4 and the flat section 9.

FIG. 30 shows a typical condition at a certain, first excitation frequency. The arms 6 on the one hand oscillate in the longitudinal direction (X-direction) and on the other hand to and away from one another (Y-direction). Depending on which of the two oscillations leads the other, the contact regions 7 execute for example an elliptical movement with a respective rotational direction. By way of this, the contact regions 7 execute a force on the passive element 1 in the positive or negative X-direction, given the presence of this passive element 1.

FIG. 31 corresponds to a second excitation frequency at which the contact regions, mainly oscillate and abut one another in the Y-direction. With the presence of the passive element 1, as a whole no force is exerted onto the passive element, and it is thus guided only in a loose manner and may be moved by forces acting from the outside.

FIG. 32 corresponds to a third excitation frequency, with which the arms 6 execute a torsion movement about their longitudinal direction, thus about the X-direction. The arms are preferably shaped from the same material, but differently seen in the Y-direction.

A rotation of individual points of the contact regions 7 in the YZ-plane, thus in the plane perpendicular to the movement axis results. The direction of the rotation again may be determined by the selection of the excitation frequency. Thereby, the contact regions 7 of both arms rotate in the same rotational direction.

Advantageous excitation frequencies for a single-piece resonator 3 according to FIGS. 30-32, with dimensions of 2.5×2.5×4.5 millimetres are approx. 149 kHz (FIG. 30) or 26 kHz (FIG. 31) or 148 kHz (FIG. 32). Basically, the frequencies are dependent on the geometry of the resonator 3 and on material data, such as the modulus of elasticity, transverse contraction and density. For example, the resonator 3 may be manufactured of steel and be operated at frequencies between 300 kHz and 500 kHz, in particular at 420 kHz for a forwards movement, and 350 kHz for a backwards movement. Or the resonator 3 may be manufactured of aluminium and operated at frequencies between 150 kHz and 300 kHz, in particular at 165 kHz for a forwards movement, and 250 kHz for a backwards movement.

The frequencies of different oscillation modes are matched to one another such that a desired total movement results. On design of the active element 2, one considers the following:

On separate consideration of the two deflection directions, on the one hand oscillations in the longitudinal direction (without bending) and on the other hand pure bending movements are present with a uniform beam. If one considers the frequency of the longitudinal oscillations, then the frequency with the maximal deflection corresponds to a first oscillation mode. The amplitude and thus a step width of the drive is maximal. The frequency increases and the amplitude decreases, at higher modes.

If one considers a pure bending movement, then for example the third bending mode may be applied to the same frequency as the above determined first oscillation mode of the longitudinal oscillation. This permits a maximum lifting of a free end of the respective arm 6 from the passive element 1. Thus with a maximal step width, one achieves a large movement in the bending mode, and a reliable forward drive with maximally large steps results as a whole.

Since the natural resonance in the longitudinal direction with a uniform beam, in a first approximation, correlates linearly to the length, but the bending oscillation in contrast is dependent on the higher powers of the thickness of the resonator, independent parameters are present with which the total oscillation behaviour of a resonator 3 may be set. With a given material, the desired oscillation behaviour is set by way of the selection of the geometry.

In this example, the passive element 1 designed as a rod or pin has a diameter of 1.5 millimetres. Transport forces of more than 1 N may be produced with the described motor with two piezoelements 4.

FIG. 33 shows a course of drive forces or moments F (for example in Newton or Nm) in dependence on an activation frequency f (for example in kHz). Each movement type corresponds to at least one specific frequency f. The following specific frequencies occur for example with an increasing frequency:

f31 for a freely-rotatable moment, i.e. neither a clamping effect occurs, nor is a force produced as a whole
f1 for a linear movement forwards
f32 for a freely rotatable moment
f2 for a linear movement backwards
f4 for a rotation in the clockwise direction
f5 for a rotation in the anti-clockwise direction One factor which is to be considered on operation of the motor according to the invention is the stiffness of the arms. The stiffer an arm is formed, the more accurately must the active and passive element fit together, and the larger is the influence of thermal expansion coefficients, manufacturing tolerances and abrasion.

The less stiff the resonator or the arms are, the less critical are these influences, but the larger must the biasing be, in order to ensure an optimal surface pressing.

An optimal surface pressing is ensured when the pointwise force is just so large that it causes no abrasion. If the pointwise force is too high, then the life duration is limited, and if the pointwise force is too low, then indeed the maximum potential of the motor is not exhausted.

FIG. 2 shows a drive in each case with two piezoelements per arm. The two piezoelements 4 fastened on the same arm 6 are preferably activated by the same supply, but are connected in a manner such that the one piezoelement contracts when the other expands. The curvature of the arm is encouraged by way of this. In another variant of this embodiment, the piezoelements 4 are connected in a manner such that in each case they contract or expand simultaneously. In this case, the piezoelements 4 primarily effect an extension or a shortening of the respective flat section 9 in the movement direction, and the movement of the contact regions perpendicular to the plane of the arms is not caused until there is an asymmetrical mass distribution at the end of the arms.

FIG. 3 shows a drive with two arm pairs 5 which point in the same direction and which are rotated by 90° to one another about the movement axis. The arms 6 are formed of a single, cross-like sheet metal piece by way of bending in the same direction. Each arm is provided with an excitation means 4. The arms 6 are constructed mechanically in an identical manner, and the excitation means 4 are connected electrically in parallel. On operation, each arm point oscillates in a plane perpendicular to the plane of the respective flat section 9. Each of the arms runs for example at an angle of at least approximately 45 degrees to the passive element 1.

FIG. 4 shows a drive with in each case two piezoelements 4 per arm 6 which are arranged next to one another in the same plane, in a plan view and a view in the direction of the movement axis 11. A movement component of the arm 6 is excited within the XY-plane by way of the phase-shifted activation of the two piezoelements 4 arranged next to one another. This is illustrated in FIG. 5. A rotation of the passive element 1 about the movement axis is excited by way of this.

The piezoelements 4 on the same arm 6 are thereby preferably
either polarised in the same direction and are activated with signals of different polarity,
or are activated with the same drive signal, but are however arranged reversely polarised on the flat section 9.

The piezoelements 4 on the two arms 6 of an arm pair 5 are preferably arranged and/or activated, in a manner such that when the one arm 6 bends in the positive Z-direction, the other arm 6 bends in the negative Z-direction.

Figure 6:
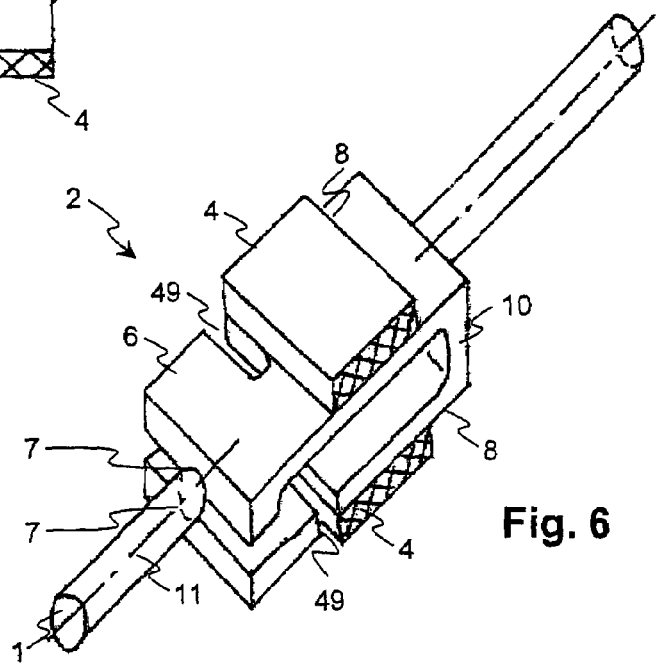

FIG. 6 shows a drive with an asymmetry in the plane of the arms, instead of the asymmetric activation according to the FIGS. 4 and 5. The arms are shaped asymmetrically with a view onto the arm plane, thus onto the XY-plane. This is effected in the embodiment form of the invention according to FIG. 6 by an incision or by slots 49 in this arm plane. Alternatively, this may also be effected by a formed-out region of the arms 6, in particular in the region of the free ends, in the arm plane and in the Z-direction. An oscillation of the contact regions 7 within the plane of the arms may also be excited by way of such asymmetries. This oscillation superimposes on the oscillation perpendicular to the plane of the arms, which leads to a rotation of individual points of the contact regions 7 in the YZ-plane, as is explained in combination with FIG. 32.

Figure 7:
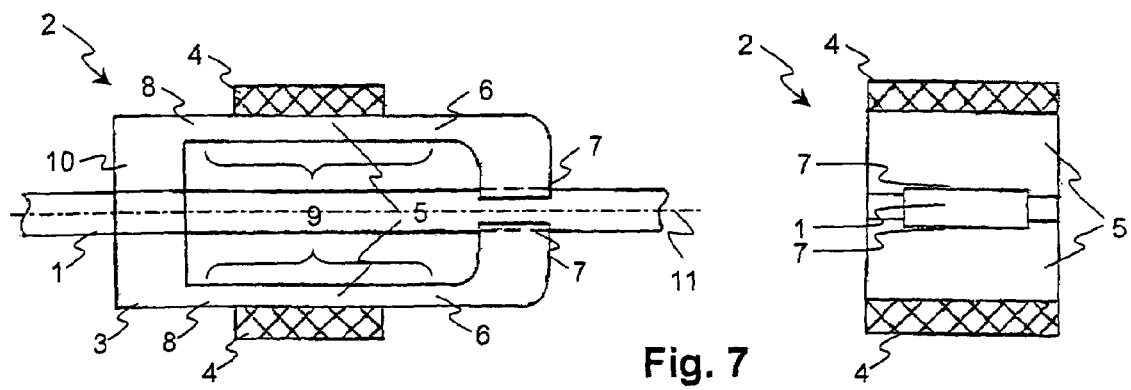
FIG. 7 a drive with a flat, rectangular passive element.

FIG. 7 shows a drive with which the passive element 1 is shaped in a flat and essentially rectangular manner. Only a translatory movement is possible with this. In an analogous manner, any other prismatic or cylinder-shaped and non-rotationally symmetrical cross sections of the passive element 1 are possible. The respective cylinder axis thereby is parallel to the movement axis 11 and preferably coincides with the axis of symmetry of the resonator 3.

Figure 8:
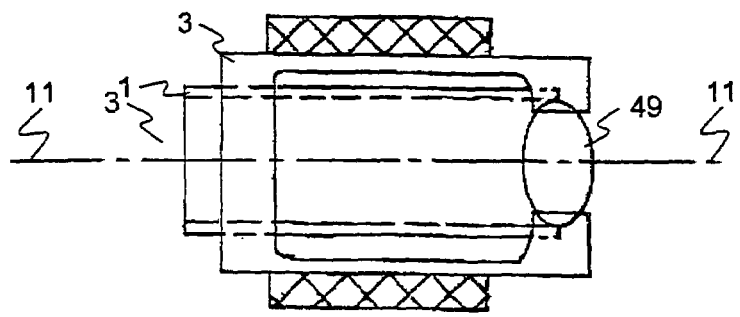
FIG. 8 a drive with a tubular passive element.

FIG. 8 shows a drive with a tubular, passive element. The passive element 1 is for example a carrier of an optical element, such as for example a camera lens 48, so that the drive may be used for an auto-focussing- or zoom function 7. The passive element may also comprise and thus position a fibre-optic such as a glass fibre.

Figure 9:
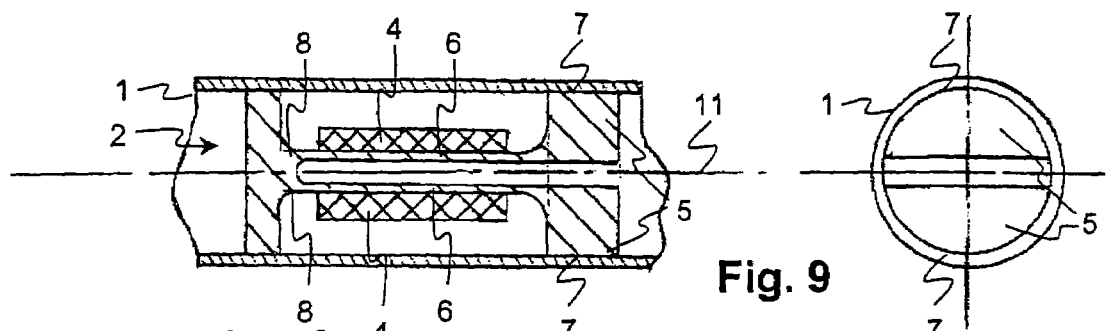
FIG. 9 a drive, with which the active element is designed as an inner runner, in a lateral view and a view in the direction of the movement axis.

FIG. 9 shows a drive with which the active element is designed as an inner runner, in a lateral view and in a view in the direction of the movement axis. The manner of acting is basically the same as with the previously shown embodiment, but here the biasing forces and drive forces are directed to the outside, and the passive element encloses the active element 2 at least partly. Here too, rotatory, translatory and combined helical movements are possible. Instead of a round, tubular passive element 1, this may also have a different hollow profile, such as a rectangular profile, or an open profile such as a U-shaped profile for example. This permits a clean linear movement without a rotational component. With an open profile such as a U-profile, the active element may also be firmly held, and the passive element 1 may serve as a runner.

Figure 10:
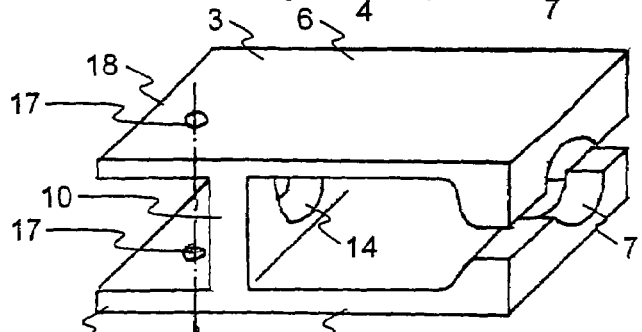
FIGS. 10 to 12 various variants for fastening an active element.
Figure 11:
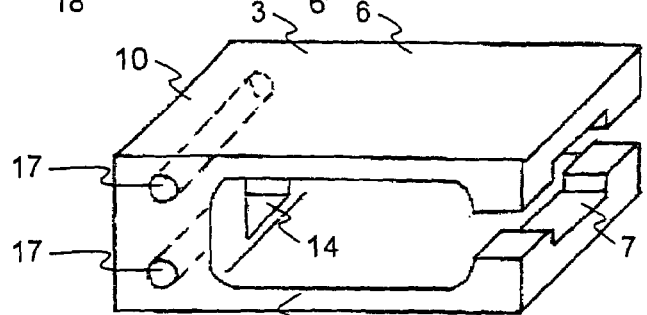
Figure 12:
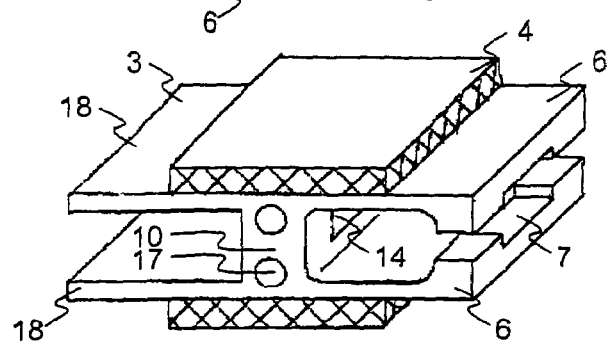

FIGS. 10 to 12 show different variants for fastening an active element 2. The active element 2 is to be fastened on a reference body, for example a mechanical apparatus, of which the drive forms a part. Or the active element 2 is to be fastened on a further part to be moved. For this, the fastening is arranged in each case at node points of the spatial oscillations of the resonator 3. The oscillations are influenced little by way of this, and little energy is lost via the fastening, and also less disturbing acoustic reflections are transmitted via the fastening. The node points are for example determined with a finite element (FEM) analysis of the oscillation behaviour of the active element 2, preferably at the applied drive frequencies.

According to FIG. 10, fastening holes 17 for receiving fastening elements such as pins for example, are arranged in an extension 18 of the arms 6 in a direction which lies opposite the arm direction with respect to the connection region 10, and arranged perpendicularly to the plane of the arms 6. According to FIG. 11, the fastening holes 17 are arranged parallel to the plane of the arms 6 in the connection region 10, and on both sides of the opening 14. According to FIG. 12, the fastening holes 17 are arranged as in FIG. 11, and the arms are extended beyond the connection region 10 in the opposite direction. The excitation means 4 extend from the arms 6 up to the extended arms 18. Thereby, the excitation means 4 are for example arranged at least approximately centred with respect to the connection region 10. In principle, with an adaptation of the oscillation frequencies of the extended arms 18, the contact regions 7 may also be arranged on the extended arms 18.

FIG. 13 shows a piezomotor with piezoelements 4 in the d31 mode, in a multilayer construction. The construction and an electrical contacting of such a piezoelement 4 are represented in cross section separately and schematically. A multilayer consists of several layers of piezoelements, between which in each case a conductive intermediate layer of e.g. silver, nickel, platinum etc. lies. The intermediate layers are connected offset and laterally to one another, so that e.g. the odd layers have a first electrical potential, and the even layers have a second potential. Typical layer thickness lie in the range of 10 to 20 microns, which leads to the fact that the electrical voltage may be lower in comparison to a mono-layer, in order to generate the same electrical field. The direction of the electrical field is indicated at E, the direction of the length extension at dL.

For example, a 0.25 mm thick mono-layer piezoelement requires 100 Volts in order to permit the E-field to become so large, that the piezoeffect becomes maximal. A multilayer piezo with 20 layers with a layer thickness in each case of 12.5 microns may thus be operated with an electrical voltage of 5 Volts.

FIG. 14 shows a piezomotor with piezoelements 4 in the d33 mode, as well as a multi-layer construction and a contacting of such piezoelements 4. With the d33-mode, the extension direction dL of the piezoelement runs parallel to the applied electrical field E. Accordingly, several piezoelements are applied on one another, and the polarisation direction of the piezoelements runs parallel to the plane of the respective flat section 9. The piezoelements comprise electrical connections 46, 47 on the surfaces running perpendicularly to the main plane of the flat section 9 or of the piezoelement 4 as a whole, thus in the YZ-plane.

FIG. 15 shows a piezomotor with piezoelements in the d15 mode. With the d15-mode, shear forces arise in the piezoelement, and a shear movement arises. In order to utilise this shear movement, the piezoelements 4 on the one hand are fastened in each case on one arm 6 as was the case up to now, and with the outer surface lying opposite the respective arm 6 are fastened on a common holding body 19. FIGS. 16 and 17 show a piezomotor according to FIG. 15 in different movement conditions. The resonator 3 is accelerated to and fro along the movement axis in the X-direction by way of the shear movement of the piezoelements 4, without thereby the arms extending or shortening significantly. As described further above, the free ends of the arms may be set into a driving oscillation by way of this. In order to permit this oscillation, the arms comprise a free region 200 between the piezoelement 4 and the contact region 7, which is not connected to the piezoelement 4 and is stiffened by way of this.

According to one variant of this embodiment, the resonator 3 is of two parts and at the left side, instead of the connection region 10, also comprises an end capable of oscillation, with a free region and individual contact regions 7. A web may be arranged between the two parts of the resonator 3 similarly as in FIG. 13, so that this resonator is again of one piece.

FIG. 18 shows one advantageous design of the passive element 1. Channels 21 are formed on the periphery of the passive element 1. These permit dirt and/or abrasion particles to be led away from the peripheral surface. Fluctuations of the drive force and of the speed are reduced by way of this. The channels 21 run preferably in a circular manner or helically at the periphery.

FIG. 19, analogously to this, shows channels 21 which are formed on the contact region 7 of an active element 2. The channels 21 in another preferred embodiment of the invention form a micro-toothing, and by way of this improve the force transmission between the active element 2 and the passive element 1.

Figure 20:
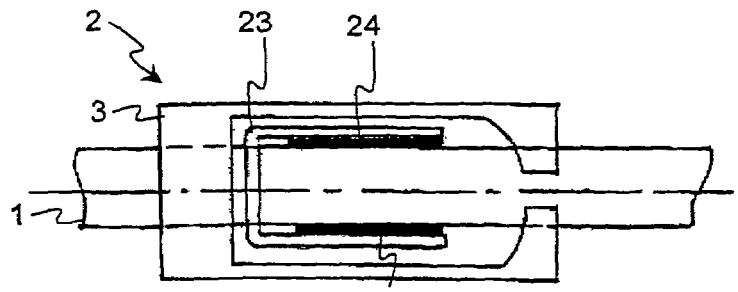

FIG. 20 shows a U-shaped or tuning-fork-like wiper 23 which is arranged within an arm pair 5, and is fastened at the connection region 10, so that the wiper 23 has no noticeable influence on the oscillations of the resonator 3. The wiper 23 comprises cleaning means 24 such as for example a felt- or rubber strip which move together with the active element 2 and thereby clean the passive element 1.

Figure 21:
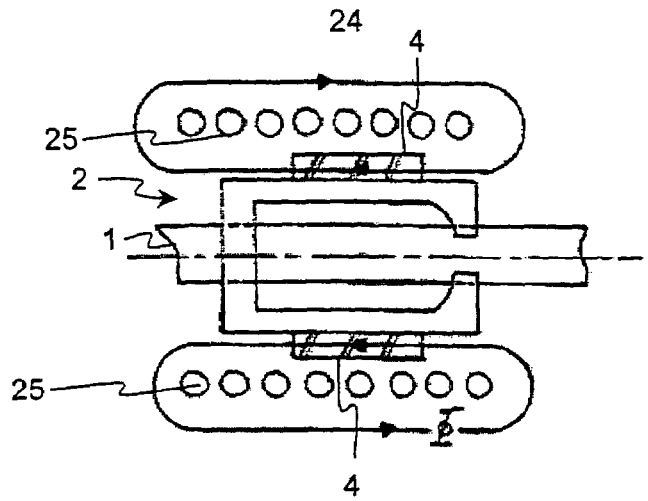
FIG. 21 a drive with a magnetostrictive active principle.

FIG. 21 shows a drive with a magnetostrictive manner of action. Generally, either the passive element 1 or the active element 2 may be firmly held with respect to an environment. If the passive element 1 is firmly held, then the active element 2 is indicated as a runner. The energy supply of the active element 2 becomes a problem with longer translatory and lasting rotatory movements. This problem is solved in the embodiment according to FIG. 21, in that a device for producing a magnetic field and which is connected to the passive element 1 is arranged along the passive element 1. This device is for example a coil 25, whose windings run around the passive element and a space for the active element 2. A magnetic field is produced in the coil 25. The active element 2 as excitation means 4 comprises a magnetostrictive element, for example of Terfenol which mechanically deforms in dependence of the magnetic flux indicated at Φ. Oscillations of the resonator 3 may be excited by way of this.

Figure 22:
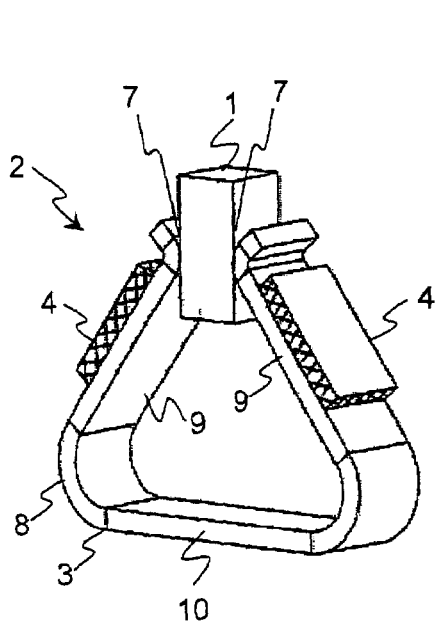
FIG. 22 a drive with a single-piece, bent resonator.

FIG. 22 shows a drive with a single-piece, bent resonator 3, similarly to that of FIG. 3, but with only two arms 6. The resonator 3 is bent of a single, flat elongate sheet metal piece at two spring regions 8. The region between the spring regions 8 is the connection region 10, on which the resonator 3 is fastened on another body. The two regions between the spring regions 8 and the ends of the sheet metal form the arms 6 with the flat sections 9. The arms 6 run for example at an angle of approx. 45 degrees with respect to the connection region 10, and are equipped with excitation means 4 or piezoelements 4. The sheet metal piece is slightly bent up at the free ends of the arms 6, by which means on the one hand the contact regions 7, and on the other hand the asymmetry perpendicular to the plane of the arms, which is mentioned above, results. The contact regions 7 are preferably adapted to the peripheral shape of the passive element 1, as is shown in FIG. 24. The shown embodiment of the invention is designed for a limited linear movement of the passive element 1. An opening 14 may be provided in the connection region 10 for larger movements.

Figure 23:
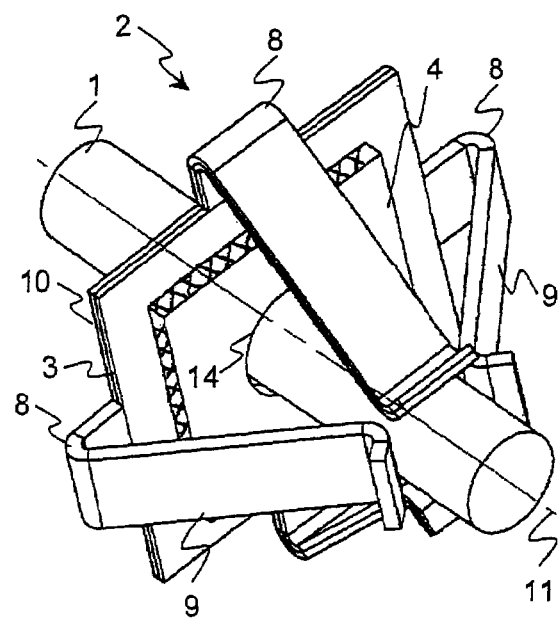
FIG. 23 a drive with only one excitation means.

FIG. 23 shows a drive with only one excitation means 4. The drive is shaped similarly to that of FIG. 3, but comprises only one piezoelement 4 which is arranged on the connection region 10, as well as wider arms. The four arms 6 have the same orientation with respect to the movement axis, and are preferably mechanically designed in the same manner. Since no active elements are attached on the oscillating arms, their natural frequencies may be set in a very accurate manner. With active arms as in the FIGS. 3 and 22, and with an electrical parallel activation of the excitation means, the same frequency is imposed on each of the arms 6. Passive arms such as in the FIGS. 23 and 24 however oscillate in a free manner. For this reason, as a rule, a smaller energy requirement occurs with the passive arms. In reality, the passive arms 6 in each case comprise individual resonance frequencies which slightly differ from one another. These differences are either of a tolerable magnitude, or may be reduced by trimming. The trimming is effected for example by way of erosion of material of the arm, for example with a laser.

FIG. 24 shows a drive similarly to that of FIG. 23, but with two arm pairs which point in opposite directions and are rotated by 90 degrees to one another about the movement axis 11. The natural frequencies and the oscillation modes of the arms 7 are matched to one another such that the upper arm pair 5 executes a pulling movement and the lower arm pair 5 an abutting movement at a first frequency, for example 200 kHz, and the active element moves upwards by way of this. At a second frequency, for example 300 kHz, the lower arm pair 5 executes a pulling movement, and the upper arm pair 5 an abutting movement, and the active elements 2 moves downwards.

The drive is preferably formed by a single, cross-like sheet metal piece, from which a first arm pair 5 arises by way of bending two arms of the cross in a first direction out of the plane of the sheet metal, and a second arm pair 5 by way of bending the other arms in the opposite direction.

A round formed-out region of the contact regions 7 is shown by way of example in a detailed view to FIG. 24. This formed-out region forms a part of a cylinder inner surface and thus corresponds to the shape of the cylindrical passive element 1. Corresponding formed-out regions may also be designed on the embodiment forms according to the other figures.

Figure 25:
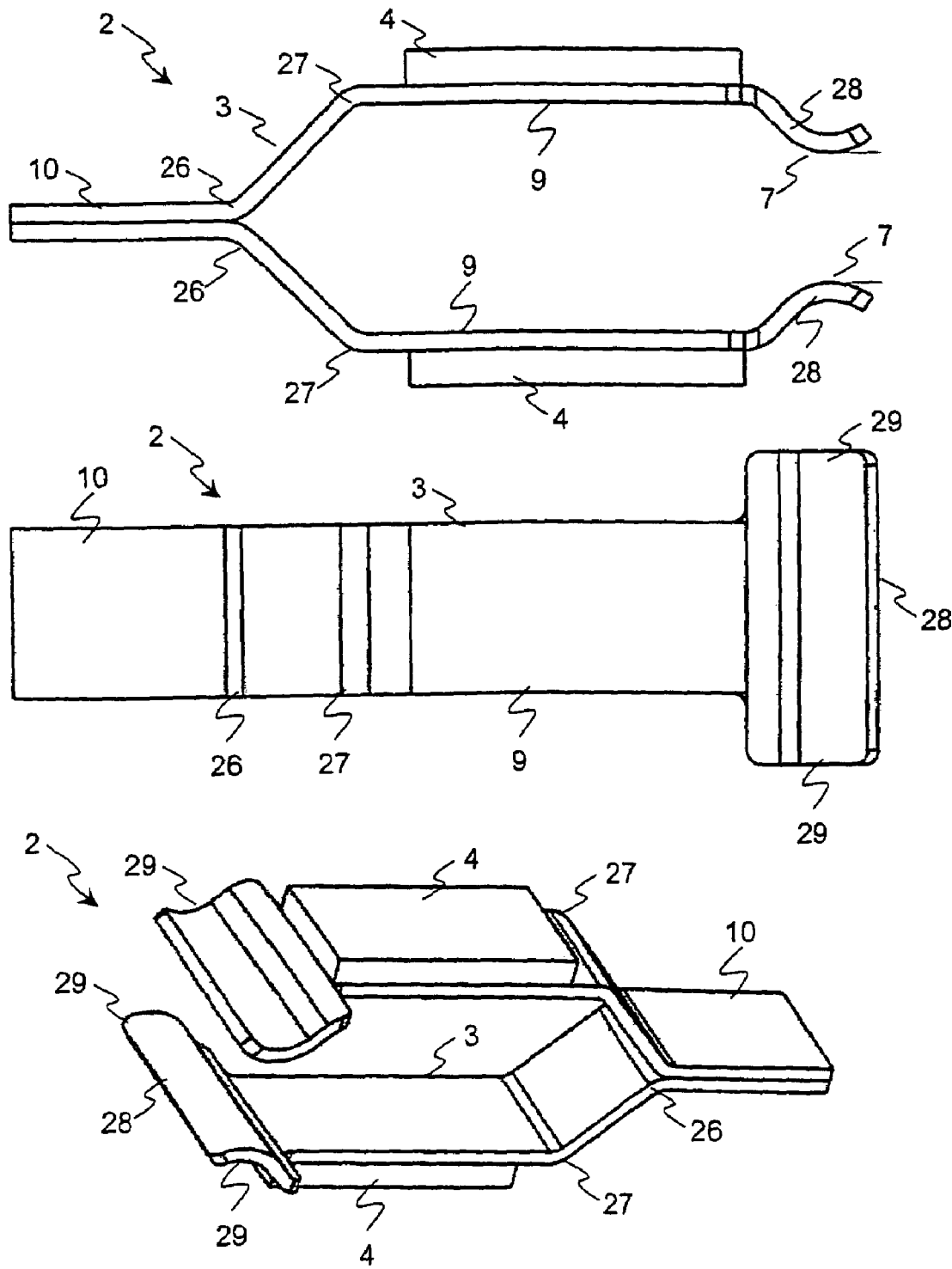
FIGS. 25 to 27 active elements of bent sheet metal parts, in each case in different views.
Figure 26:
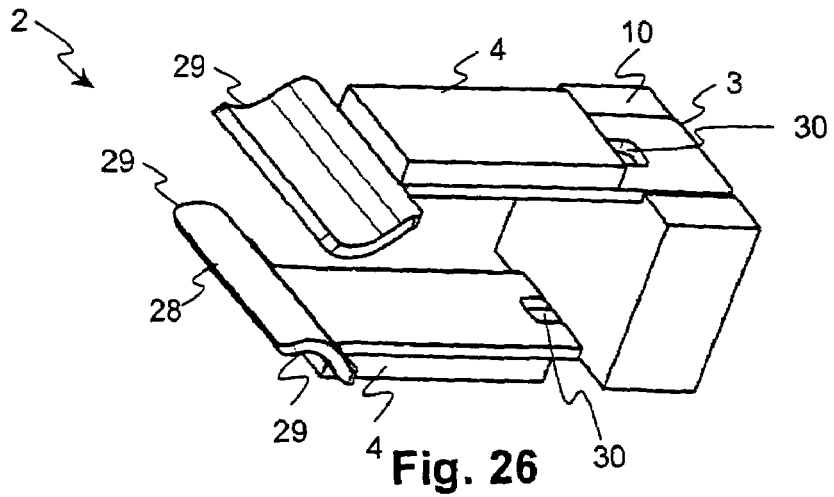
Figure 27:
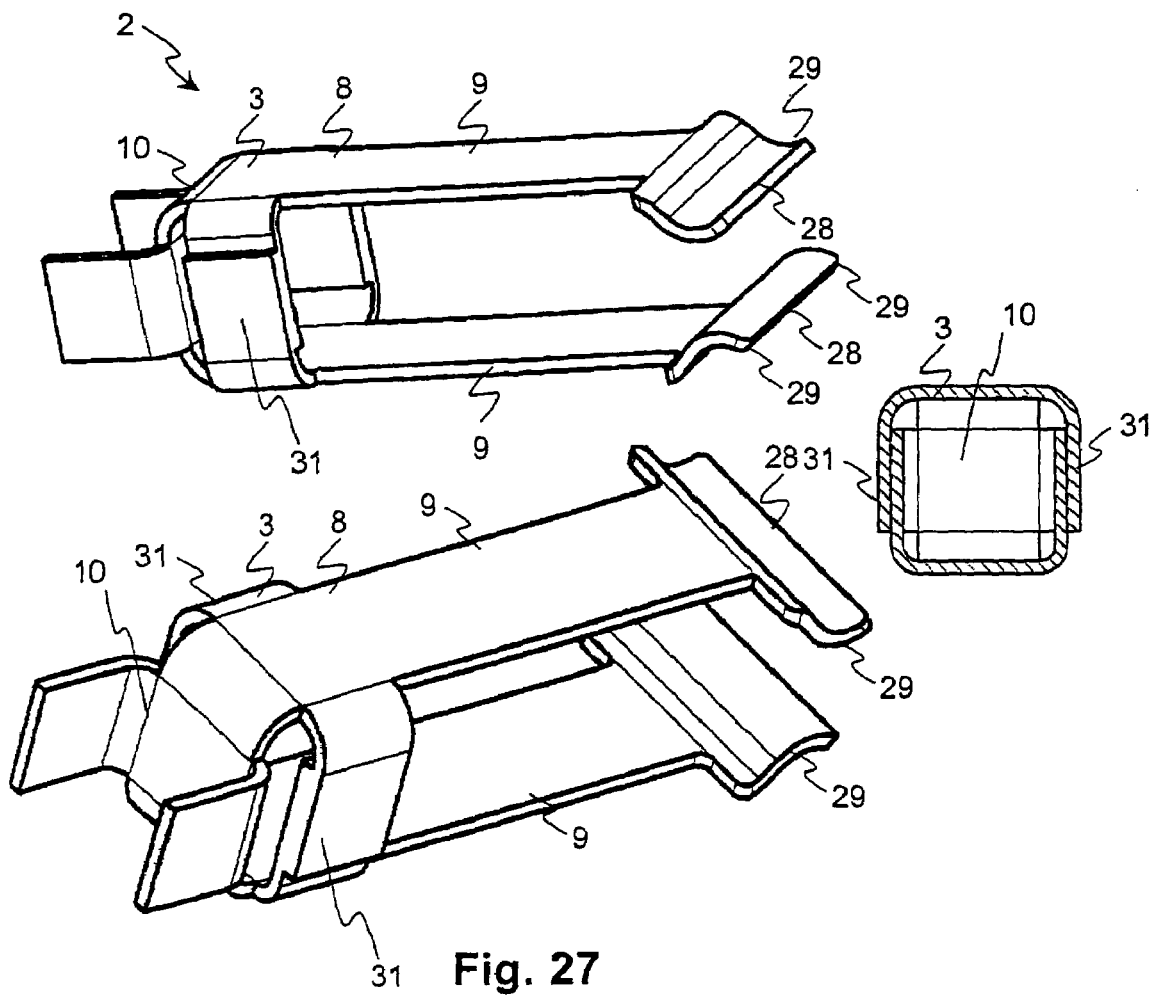

FIGS. 25 to 27 show active elements of bent sheet metal parts, in each case in different views. The resonators 3 in each case may be manufactured as punched- or bent parts in an inexpensive manner.

FIG. 25 in various views, shows a drive whose resonator 3 consists of two elongate sheet metal parts which are rigidly connected to one another, for example welded, in the connection region 10. The two sheet metal parts in the connection region 10 run parallel to one another and parallel to a plane of symmetry of the resonator 3. Connecting to this, the sheet metal parts are bent away from one another in each case by way of a first sharp bend 26, and subsequently are bent to one another again by a second sharp bend 27. The first as well as the second sharp bend and the sheet metal section lying therebetween act as a spring region 8. Subsequent to the second sharp bend 27, the flat sections 9 with the excitation means 4 attached thereto are essentially parallel to one another. Subsequent to the flat sections 9, the sheet metal parts are bent to one another asymmetrically with respect to the plane of the respective flat section 9, out of this plane, and form two contact sections 28 with the contact regions 7, said contact sections being curved towards one another. The sheet metal parts in the region of these contact sections 28 are preferably wider than in the flat section 9. By way of this, the contact sections 28 have a relatively large mass outside the plane of the flat sections 9, which improves the characteristic oscillations in the context of the invention. The oscillation frequencies of the arms 6 may be matched by way of grinding away the laterally projecting parts 29 of the contact sections 28.

The arms for example are approx. 4 mm long and are punched of CuBe sheet metal, wherein the operating frequencies lie for example at 50 kHz to 300 kHz. The piezoelements 4 are connected on the one hand via the arms 6 and on the other hand via (non shown) wires. This is also the case for the following two embodiments according to the FIGS. 26 and 27.

In a preferred embodiment of the invention, the laterally projecting parts 29 of the contact sections are differently long. With this therefore, an asymmetry of the arms 6 is present in the view of the plane onto the flat sections 9, by which means an oscillation may be produced for exciting a rotational movement, as is explained in combination with FIGS. 5 and 6.

FIG. 26 shows a drive with which the arms 6 in the free region are designed similarly as in the preceding embodiment form. However, a further body is provided as a connection region 10, on which the arms 6 are each fastened individually. The arms 6 for reducing the stiffness between the arms 6 and the connection region 10, are shaped with a smaller cross-sectional area in the vicinity of the connection region 10, by which means a spring region 8 is formed. Recesses 30 for example are formed on the arms, or the arms are shaped more thinly or more narrowly.

FIG. 27, in two different views and in a cross section shows a further resonator 3 again with a similar end region. The resonator 3 is however punched and bent from a single sheet metal part. Two arms are bent to one another out of a plane of a connection region 10, and run parallel to one another up to the contact sections 28. These parallel sections 9 are provided for fastening the excitation means 4 (not drawn). Subsequent to the connection region 10, the arms 6 comprise stiffening tabs 31 which are each bent towards the oppositely lying arm 6, and are firmly connected to an oppositely lying stiffening tab 31. The resonator 3 is stiffened at the firm end by way of the sheet metal tabs 31 folded and connected to one another in such a manner.

Preferably two fastening tabs are bent out of the plane of the connection region 10 in a direction opposite to the arms 6.

FIG. 28 shows a drive with a cylinder as a passive element, which is arranged perpendicularly to the axis of symmetry of an arm pair. With completely symmetrical arms 6 and with an equal activation, the contact regions 7 on the left arm would for example rotate in the clockwise direction, and the contact regions 7 on the right arm in the anticlockwise direction. This is desired for an embodiment according to FIG. 29, but not for the present one. For this reason, a different oscillation behaviour of the arm 6 is produced by way of a slight asymmetry in the shape of the arms, as shown in FIG. 28. The shown thickening on a spring region 8 shortens the arm lengths and thus lifts the natural frequency, and thus changes the phase shift between the oscillations perpendicular or parallel to the plane of the arm and thus also the rotational direction of the contact region 7. Alternatively or supplementary, one may also carry out a separate activation of the piezoelements 4, in order to achieve the reinforcing movements of the arms 6.

FIG. 29 shows a drive with which the passive element comprises two cylinders as rotors 15 which may be rotated in opposite directions. The two rotors 15 have the same or different diameters, and are in each case mounted by holding elements 16. The rotors 15 each have a rotation shaft which runs perpendicularly to the direction of the arms 6 (X-direction) and parallel to the plane of the arms 6 (XY-plane). The rotors 15 are biased relative to one another by the contact regions 7, and are driven by the contact regions 7 on operation of the motor. For this, the arms 6 are shaped essentially mirror-symmetrically to one another, so that they likewise oscillate symmetrically to one another, and thus effect a rotation of the rotors 15 in opposite directions, wherein the rotors 15 roll on one another at their common contact point. One or both shafts of the rotors 15 is/are set up for the drive of a further apparatus.

Figure 35:
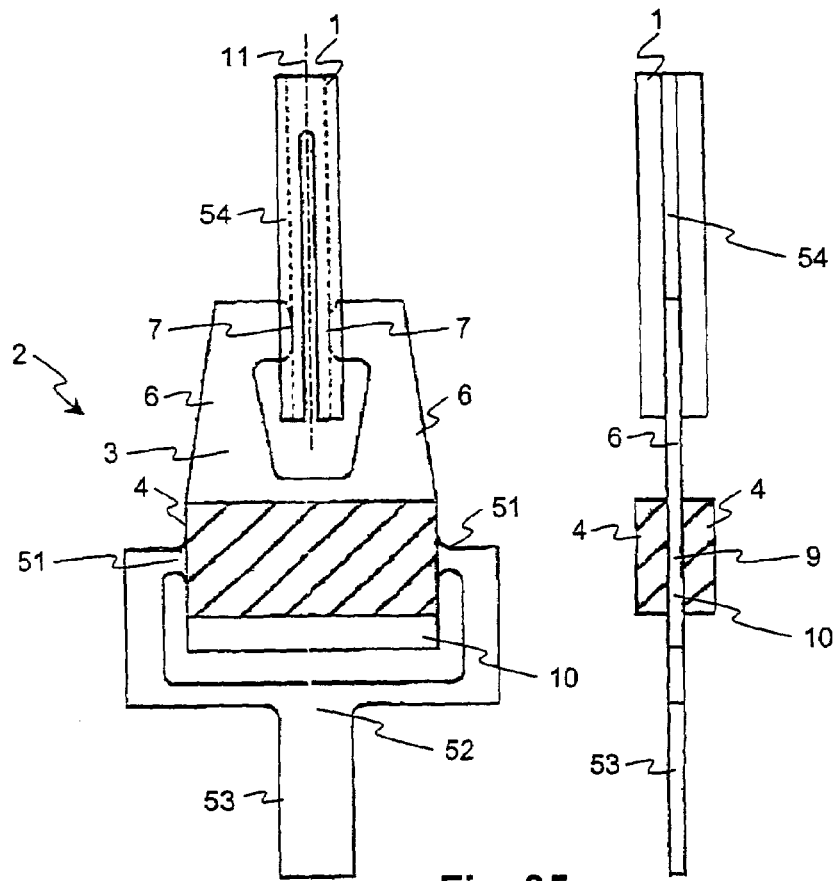
FIGS. 35 and 36 further preferred embodiments of the invention.

FIG. 35 shows a further preferred embodiment of the invention which has a particularly flat design, in a plan view and a lateral view. The active element 2 comprises flat arms 6, whose planes lie parallel to one another and lie in the same plane. The flat section 9 of the resonator 3 is arranged with the excitation means 4, parallel to this plane or in this plane. The driving movements of the contact regions 7 likewise take place parallel to this plane. The resonator 3 merges into two resilient arms of a Y-shaped holder 53 via transition regions 51. A node point 52 of oscillations of the resonator 3 lies where the arms of the holder 53 unite. The resonator 3 and the holder 53 are preferably shaped of a single, flat sheet metal part.

The passive element 1 is elongate and is movably arranged along its main extension direction or movement axis 11, with respect to the active element. The passive element optionally comprises longitudinal grooves 54 for receiving the contact regions 7 of the active element 2, for guiding.

The passive element 1 is preferably designed resilient per se, so that the regions which come into contact with the contact regions 7 of the active element 2 are movable relative to one another in a resilient manner. The arms 6 may have a relatively large stiffness in the arm plane by way of this.

The spring, amongst other things, serves for compensating the wear of the contact regions 7 and of the passive element 1.

The arms 6 of an arm pair 5 counteract one another with respect to the passive element 2 in directions which differ from the permissible movement directions of the passive element 2, and act with one another in the movement direction, thus increase their effect in the movement direction. The contact regions 7 may also move outside the plane of the flat arms 6 or of the resonator 3, thus execute an oscillation running in three dimensions, in accordance with the excitation frequency. In order to utilise such oscillation modes for a drive, the passive element 1 is preferably designed without the groove shown in FIG. 35, for example with flat pates which are sprung relative to one another. The plane of the plates, and also their movement direction, preferably runs perpendicular to a connection straight line between the contact regions 7 in the idle condition. Preferably, the movement direction also runs parallel to the plane of the arm sheet metal, but it may also run perpendicularly or at an angle to this plane. Mostly several oscillation modes exist, which result in a movement forwards or backwards, parallel to the plane of the arms. For the operation, a pair of suitable excitation frequencies which lie close to one another are selected - one for forwards, and one for backwards. This has the advantage that the same coil may be used for increasing the voltage for both frequencies.

Figure 36:
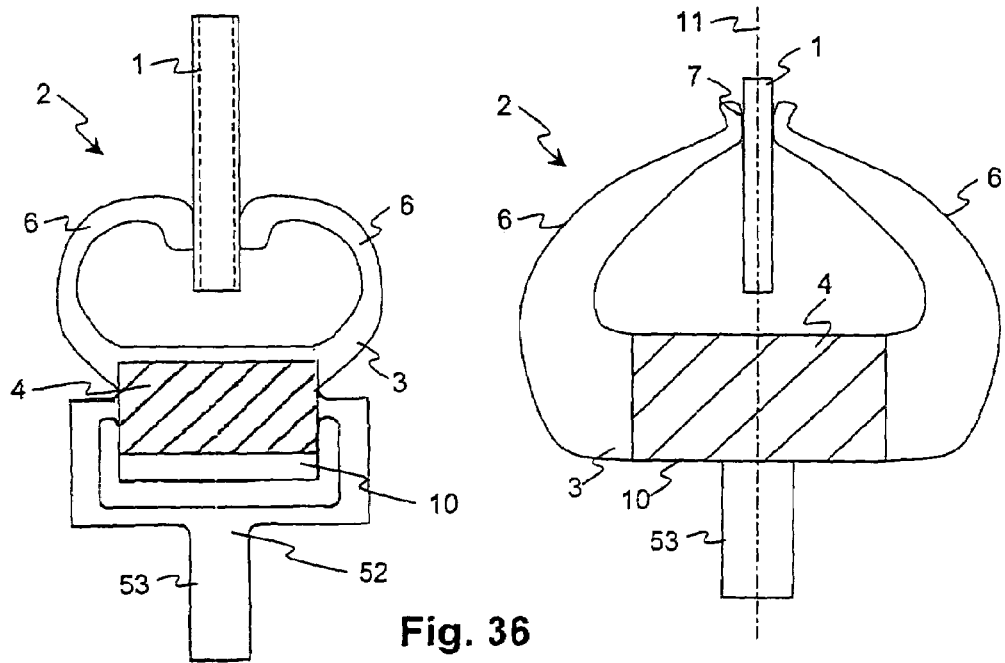

Alternatively, as is shown in FIG. 36, the arms 6 may be formed in a resilient manner and the passive element 1 in return may be designed without any resiliency. In this embodiment too, the arms 6, the flat section 9 with the piezo-element 4, as well as the holder 53 may be preferably designed on a single part. The holder may also connect without the Y-shaped arms directly on the side of the flat section 9 which lies opposite the arms 6.

The excitation means 4 with their extension direction are arranged parallel to the plane of the resonator 3 for exciting the oscillations in the embodiments according to the FIGS. 35 and 36. A single piezoelement 4 on one side of the resonator 3 may also be present. With adequately high excitation frequencies thereby, it is above all the oscillations in the resonator plane or arm plane which are excited, and the lower-frequency bending oscillations of the resonator 3 are not excited significantly.

FIG. 34 shows a block diagram of a circuit for activating a piezomotor. The drive circuit comprises a signal generator or multi frequency generator 41, for producing signals of different frequencies. The multi- frequency generator 41 for this compromises several individual frequency generators 42, of whose output signals, one may be selected by way of a change-over switch. This signal as an output signal of the multi-frequency generator 41 is led to an amplifier 44. The motor 45 is activated with the output signal of the amplifier. The individual frequency generators 42 may also produce signals with several superimposed frequency components for exciting combined, e.g. helical movements. The signal generator 41 may be constructed conventionally (analogy) or numerically (digital). The suitable activation is selected depending on the application, integration and complexity of the activation signal. Thereby, the frequency, signal shape and amplitude may be varied. The amplitude essentially determines the travel speed.

The amplifier 44 or driver adapts the produced signal from the generator 41 to the piezomotor 45. A required driver topology may be selected depending on the shape and the size of the activation signal. A bridge circuit is adequate for a rectangular activation. A linear amplifier or a digital amplifier is required for all other signal shapes, e.g. a "Class D" amplifier for pulse width modulation (PWM). Under certain circumstances, one may completely make do without the amplifier 44 with the use of multilayer piezoelements.

An inductance may be connected between the piezomotor 45 and the driver electronics 44 depending on the activation mode. In the ideal case, the inductance is designed such that with the piezomotor capacitance, it forms a series-resonance oscillation circuit in a preferred motor operational frequency. An increase of the voltage may be achieved via the piezoelements 4 by way of this. With a rectangular activation, the series oscillation circuit furthermore serves as a filter and signal transformer: The piezomotor fed by a rectangular signal is activated with a sine signal increased in amplitude, by way of the intermediate connection of an inductance.

The oscillation circuit, consisting of piezomodule and coil, depending on its quality, permits roughly a quadrupling of the voltage. The effective voltage may be doubled by way of re-poling the voltage supply. Thus in total, a voltage of 20 V at the piezomodule may be produced for example with a supply voltage of 2.5 V.

The frequencies for the different movement directions are preferably selected close to one another, so that the coil is as effective as possible for both frequencies. The maximum voltage of the oscillation circuit thereby is set at least approximately into the middle between the two frequencies. Typical frequencies for a resonator 3 according to the FIGS. 37 to 44 with extensions for example of 3 mm to 6 mm, lie in the region between 400 and 600 kHz.

Figure 37:
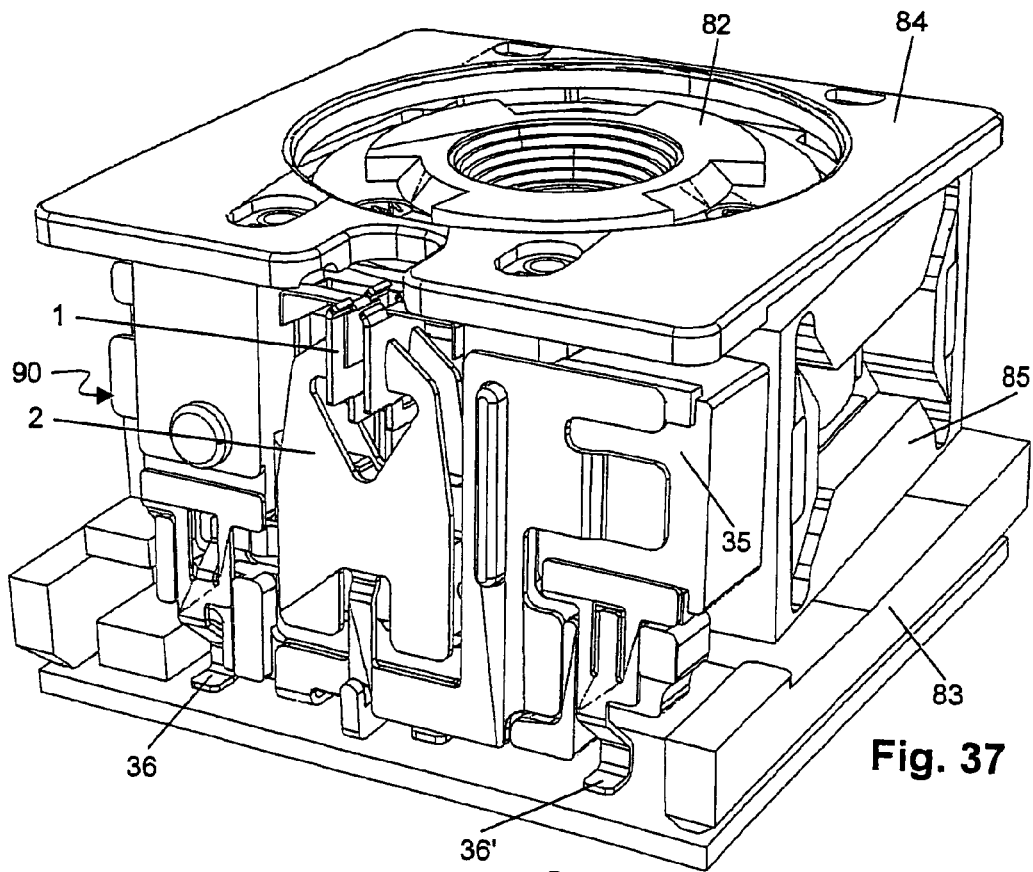
FIG. 37 a positioning unit for positioning a lens.

FIG. 37 shows a positioning unit for positioning a lens. An active part module 90 of the drive which drives a driven body 82 via a passive element 1 of the drive, is on a base body 83. The driven body 82 is assembled on the base body 83 via parallel mechanics 85. A cover part 84 as a part of the base body 83 is assembled over the driven body 82. The driven body 82 comprises a holder with a lens, whilst the base body 83 carries a picture detection chip, onto which the lens may be focussed by way of the movement of the driven body 82. The parallel mechanics 85 permits an essentially linear or straight movement of the driven body 82 with the passive element 1, with respect to the base body 83 or the active part module 90. Strictly speaking, this movement is a parallel displacement along a circular arc, for practical purposes however in the context of the drive, it may also be considered as a straight line.

The active part module 90 comprises two resonators 3, 3' which are arranged parallel to one another and which in each case on their own act essentially accordingly to the principal of FIG. 35. The contact regions 7 of the resonators 3, 3' engage on contact plates 72 of the passive element 1, which are arranged resiliently relative to one another, and may be pressed against the contact regions 7 by way of this spring effect. On exciting a common excitation means 4, the four contact regions 7 of the two resonators 3, 3' are set into spatial oscillations which drive the contact plates 72 and thus the driven body 82 in the one or other direction, depending on the excitation frequency. The oscillations as a rule have components in three dimensions as is explained in the context of the embodiment form of FIG. 35. Of these, preferably a forwards and backward movement parallel to the planes of the resonators 3,3' are utilised, and corresponding frequencies are selected for excitation.

Figure 38:
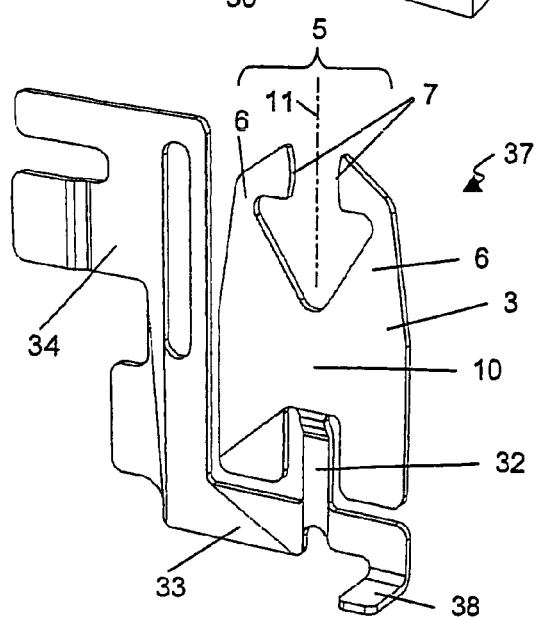
FIG. 38 a resonator with a mounting integrally formed as one piece, and electrical contacting.
Figure 39:
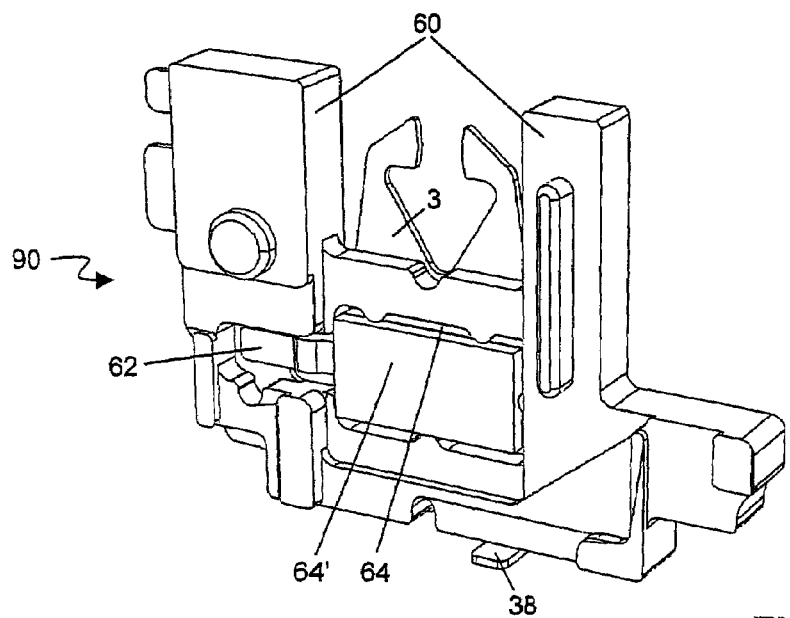
FIG. 39 a partly assembled active part module of the positioning unit.
Figure 40:
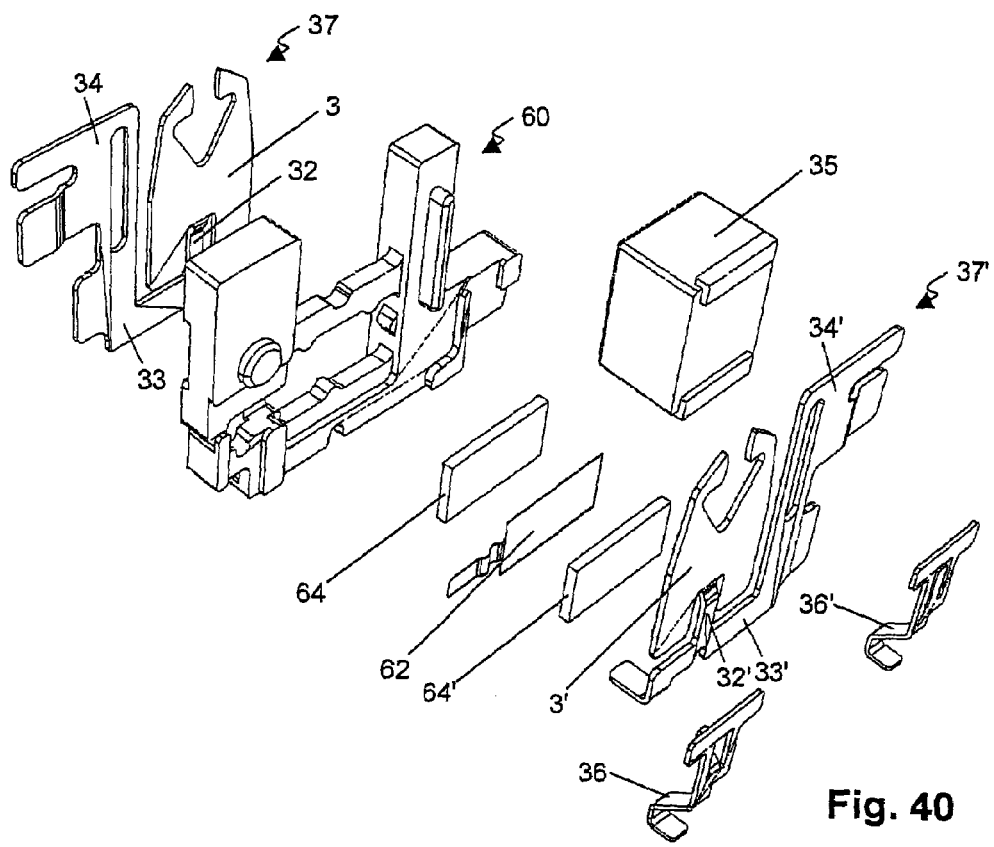
FIG. 40 an exploded drawing of the active part module.

The construction of the active part module 90 is explained by way of the following FIGS. 38 to 40. FIG. 38 shows a first resonator 3 with a mounting 32 which is integrally formed thereon as one piece. The mounting 32 leads from the resonator 3 to a base element 33 and a contacting tab 34 for electrical contacting. The mentioned components are manufactured as one piece from a thin part with essentially a constant thickness, for example punched from sheet metal. This part is hereinafter called the resonator sheet metal part 37. A second resonator sheet metal part 37' with a second resonator 3' is preferably shaped in an identical manner, and is arranged mirror-symmetrically to the first resonator 3, as is visible in FIG. 37. The manufacturing costs are reduced by way of the identical design, and the mechanical properties of the two resonators 3, 3' may be kept close to one another. In each case, one connection tab 38 leads the base elements 33, 33' to the oppositely lying resonator 3, 3' and serves for the electrical connection of the resonators 3, 3'.

FIG. 39 shows a partly assembled active part module 90 of the positioning unit. A carrier element 60 is attached on the resonator 3, and a first piezoplate 64, thereon an intermediate electrode 64 and thereon again a second piezoplate 64' are arranged in an opening of the carrier element 60, parallel to the plane of a flat section of the resonator 3. The piezoplates 64, 64' and the intermediate electrode 62 are centred by distancing lugs at the opening and in this opening, wherein the piezoplates 64, 64' still remain capable of oscillating. The carrier element 60 is preferably manufactured of plastic and in the injection moulding method.

FIG. 40 shows an exploded drawing of an active part module. Apart from the already mentioned components, the second resonator sheet metal part 37' is yet represented, as well as a coil 35 and two connection tabs 36, 36'. A first connection tab 36 is arranged for the electrical contacting of the intermediate electrode 62, a second connection tab 36' is arranged for the electrical contacting of a first connection of the coil 35. A second connection of the coil 35 contacts the contacting tab 34' of the second resonator sheet metal 37'.

The active part module 90 thus comprises an oscillation circuit, formed of the coil 35 and a double piezo between the resonators 3, 3'. The construction of the excitation means 4 as a two-layered piezoelement of two parallel plates around the intermediate electrode 62 permits the resonators 3, 3' which form the outer electrodes of the piezoelement, to be at the same electrical potential. This in turn means that the passive element 1 which contacts the contact regions 7 of both resonators 3, 3', may be electrically conductive.

Since the mounting 32 of the resonators 3, 3' is simultaneously an electrical connection, no wires and no bonding is required for contacting the excitation means 4. The mounting 32 leads out of the plane of the resonator 3 and away from this, wherein this preferably is effected in a region of the resonator 3 which corresponds to a preferred oscillation node of the drive. In the present embodiment of the invention, this region lies at least approximately at the middle of the piezoplate 6. In another embodiment of the invention, for example according to FIG. 43, this region lies at the middle of a side of a rectangular piezoplate 64. In both embodiments, the oscillations of the resonators 3, 3' and of the piezoplates 64, 64' are decoupled from the remaining parts of the active part module 90 in this manner. The intermediate electrode 62 in a transition region is waved and designed in a resilient manner for the same purpose. The transition region leads from the piezoplates 64, 64' to the carrier element 60, where the intermediate electrode 62 is contacted by the first connection tab 36.

The modulus of elasticity of the resonators 3, 3' and of the piezoplates 64, 64' is a multiple higher than that of the adhesive and of the carrier element 60. Thus the modes and the oscillation frequencies are not essentially influenced by the latter, but at the most are damped.

Preferably, the following parts are assembled on one another in the specified sequence, for manufacturing the active part module 90:
  a first resonator 3;
  a carrier element 60;
  a first piezoplate 64;
  optionally, and intermediate electrode 62 and a second piezoplate 64'; and
  a second resonator 3'.

Thereby, an electrically conductive adhesive is brought between the parts applied onto one another, at least regionally, between two steps. The adhesive is for example an adhesive with microscopic nickel balls of a standardised size, which may be cured by way of heating. The conductivity of the adhesive arises only when two conductors are pressed against one another, so that the nickel balls bridge the distance between the two conductors. The adhesive remains non-conductive in other directions. For this reason, the adhesive may be deposited generously, and for example also go around the piezoplates 64, 64' and into the intermediate space between the piezoplates 64, 64' and the carrier element 60, without a short-circuit arising.

The mentioned parts therefore, in each case with adhesive therebetween, are stacked on one another, and then heated whilst they are pressed together. On curing, the adhesive contracts and pulls the conductors together, so that a lasting pressure on the nickel balls and thus a permanent electrical connection arises.

In another embodiment of the invention, an adhesive with flakes of a conductive material such as silver is used. This adhesive is conductive in all directions and also under pressure. For this reason it is only deposited in the middle of contact regions between the parts assembled on one another, and is in each case surrounded by a region with another, insulating adhesive.

The mentioned parts are inserted into an assembly holder for example in a manual or automatic manner. The coil 35 may also yet be inserted into the holder even before the insertion of the second resonator 3', and then bonded to the second resonator 3'. Preferably, in another procedural manner, firstly the active part module 90 is manufactured without coil, and the adhesive cured. Selected, electromechanical properties of the active part module 90 are then determined, in order to ascertain deviations from the norm. For example, it is known that an oscillation mode which is to be used and which corresponds to one of the movement directions should lie at a certain ideal frequency. In the individual drives however, the exact frequency varies on account of manufacturing inaccuracies. An excitation at the ideal frequency would not be sufficient with regard to energy, or even be ineffective. For this reason, one determines by way of measurements or indirectly estimates what the actual natural frequency is for the desired oscillation mode, with the given example. The same is done for the other movement direction. The actual capacitance of piezoelement or the excitation means is likewise measured. The natural frequency of the oscillation circuit of the piezoelement-coil should lie at least approximately in the middle between the required excitation frequencies, so that the voltage increase by the oscillation circuit is as high as possible and compensated, at all excitation frequencies. With this, an inductance of the coil 35 is determined, which accordingly sets the natural frequency of the oscillation circuit. A specific coil with the closest lying inductance value is selected from a set of coils 35 which are available for selection, and assembled on the active part module 90 by way of soldering or bonding for example.

Figure 41:
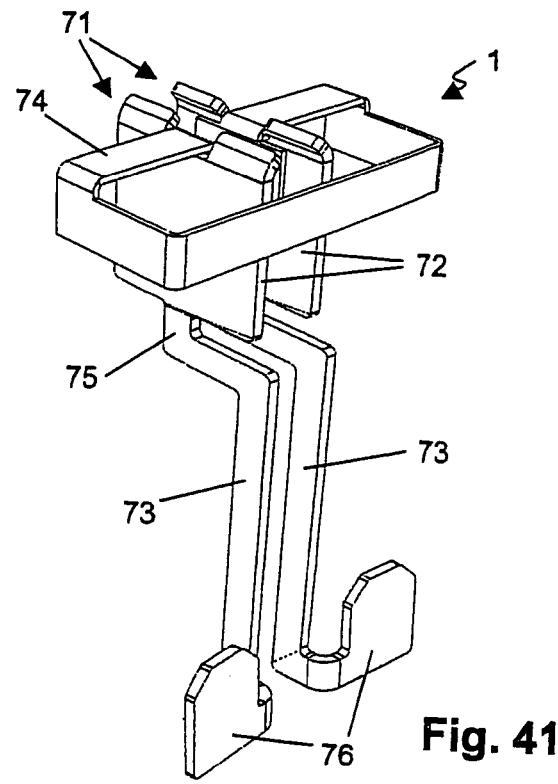
FIG. 41 a passive element according to the invention.

FIG. 41 shows a passive element 2 according to the invention. This comprises two parallel contact elements 71 which in each case are connected via a contact arm 73 to the driven body 82. The contact elements 71 are arranged resiliently towards the contact regions 7, in order to optimise the mechanical contacting between the contact regions 7 of the resonators 3, 3' and the contact elements 71. So that they may move towards and against the contact regions 7, the contact arms 73 are designed relatively long and flat. The surface of the contact arms and of the contact plates 72 thereby runs essentially perpendicular to the surface of the resonators 3, 3' and parallel to the movement direction of the drive. With this, one may also compensate a lateral shifting of the passive element 1 with respect to the active element 2—for the compensation of manufacturing tolerances, by way of displacing the contact plates 72 synchronously and parallel to one another. The contact arms 73 are comparatively stiff in the movement direction of the drive itself, so that a force transmission onto the driven body 82 is possible.

The contact plates 72 are thus able to be moved slightly against the contact regions 7. An additional spring is used in order to apply a force against the contact regions 7. These may be arranged between the contact pates 72, and in the present embodiment of the invention, the spring is realised by way of a single piece spring element 74 which as a bow is led at the outside around the two contact plates 72, in each case engages from the outside into the contact plates 72, and thus pulls them part. In each case, an end surface of the spring element 74 is preferably bonded or soldered to the respective contact plate 72. The ends of the spring element 74 are in each case preferably hooked to corresponding holding elements, such as tabs of the contact plates 72. This results in an additional impact protection.

The contact arms 73 to the contact plate 72 preferably comprise a torsion region 75 which permits a twisting of the contact plate 72 about an axis perpendicular to a connection line between the two contact regions 7 which act on the contact plate 72. This movement ability, together with the fact that the force of the spring element 74 engages between the contact regions 7 on the contact plate, has the effect that the contact plate 72 is pulled onto both contact regions, slightly rotates as the case may be, and reliably contacts both contact regions 7 by way of this.

A fastening region 76 is formed at the end of a contact arm 73 which lies opposite the contact plate, and is inserted into a corresponding opening of the driven body 82. A contact arm 73 with contact plate 72 and fastening region 76 is preferably formed as one piece and from a sheet metal part by way of punching and bending.

Figure 42:
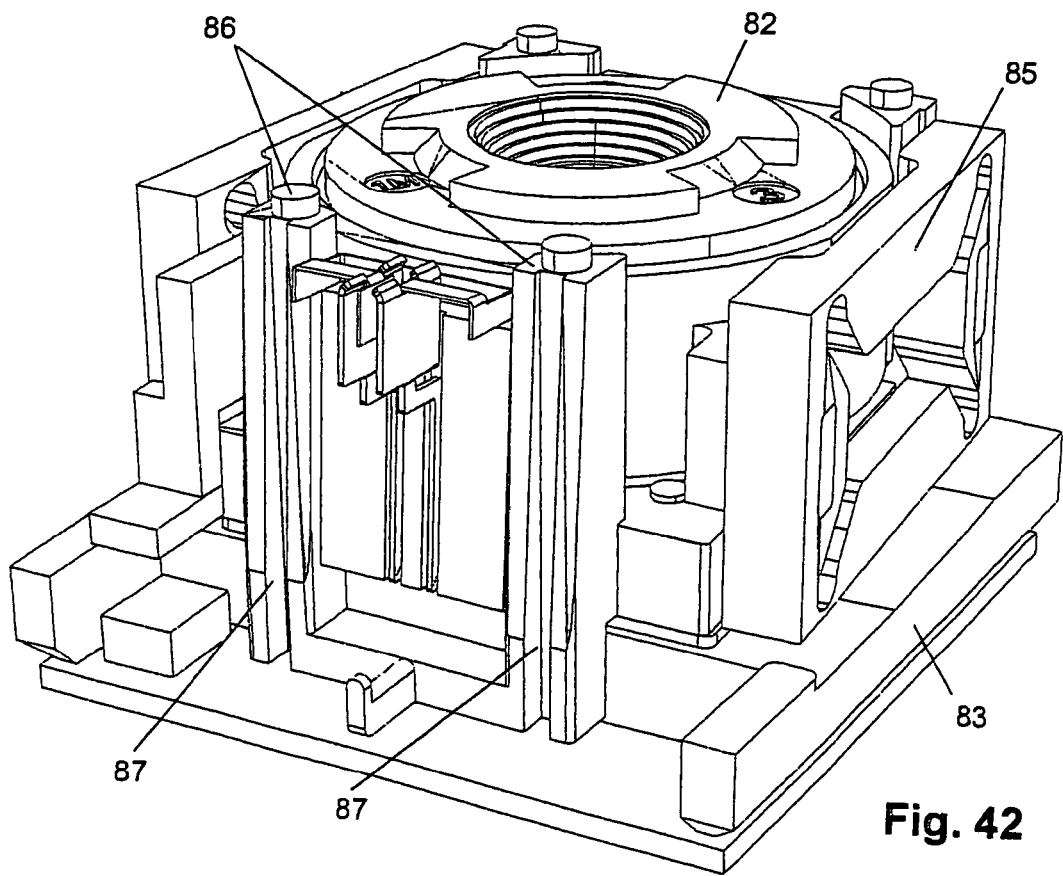
FIG. 42 the positioning unit without the active part module.

FIG. 42 shows the positioning unit without the active part module and with a removed lid part 84. It is evident how the passive element 1, formed of the spring element 74, contact plates 72 and contact arms 73 with fastening regions 76, is arranged on the driven body 82. In order to prevent an excessive movement of the flexible contact arms 73 for preventing knocks and impacts, the contact arms 73 are partly guided in slots around the driven body 82, but set free. Thus on normal operation, the contact arms 73 do not touch the side walls of the slots, and with knocks, the contact arms 73 are prevented from being loaded beyond the yield point, or from jamming or snagging in a wrong position.

It is furthermore evident as to how the driven body 82 is guided in a parallel manner between two props 86 of the base body 83. Each of the props 86 comprises a slot to the drive holder 87. On assembly of the active part module 90, in each case a corresponding element of the active part module 90 is displaceable in these slots. Inaccuracies on account of summed manufacturing tolerances may be compensated by way of this, in that the active part module 90 is pushed against the base body 83 until the connection tabs 36, 36' contact the base body 83.

Figure 43:
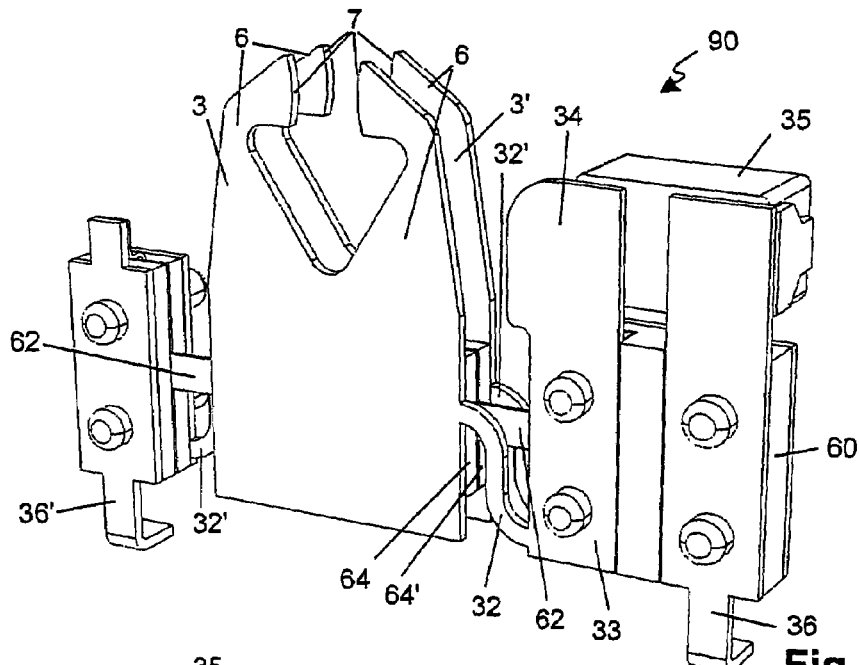
FIGS. 43-44 further embodiments of an active part module.
Figure 44:
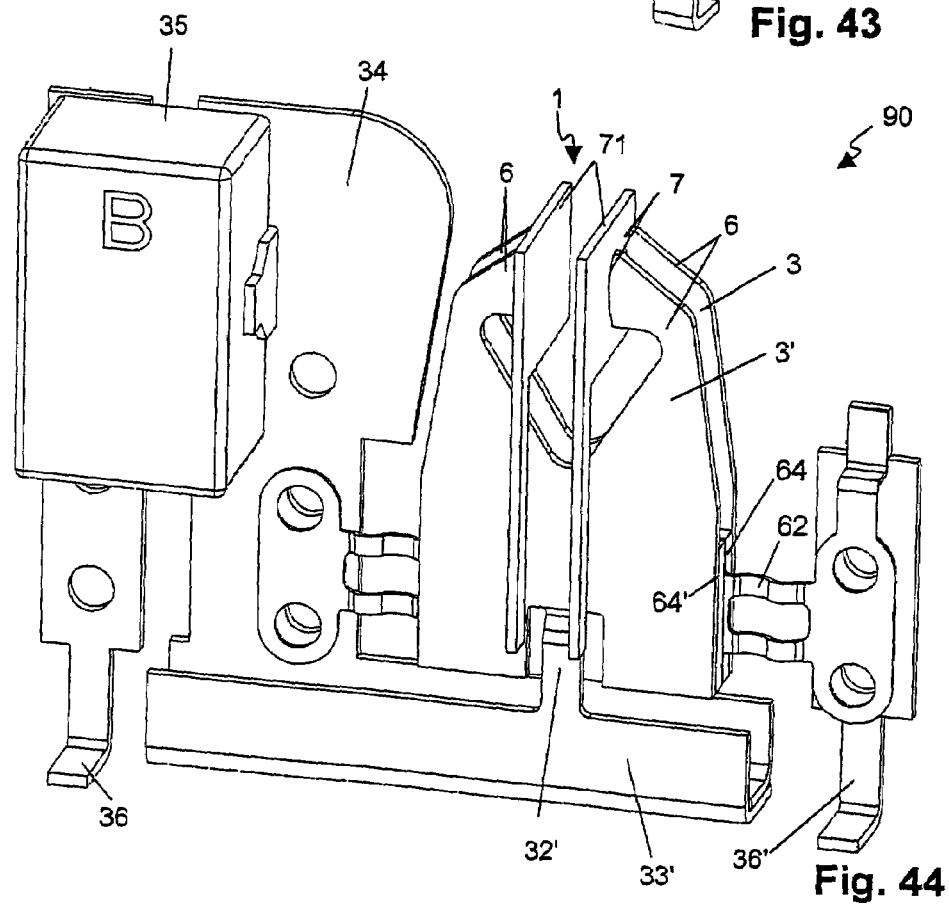

FIGS. 43-44 shows further embodiments of active part modules. FIG. 43 shows a lateral mounting of the resonators 3, 3' in the region of the middle of one side of the piezoplates 64, 64', as already mentioned. Thereby, the first resonator 3 is mounted only on one side, and the second resonator 3' on two sides in each case at least in an approximately central manner.

The carrier element 60 here serves for the insulated fastening of the first connection tab 36 to the contacting tab 34 or the base element 33. For this, as also with the second connection tab 36, the sheet metal parts are applied onto plastic pins of the carrier element 60 and riveted to these. FIG. 44 shows contact plates 72 of the passive element 1 which are fastened directly on the (non shown) driven body 82 without a further resiliency, and a two-sided mounting of the intermediate electrode 62. A carrier element 60 which connects the resonator sheet metal parts 37, 37', the intermediate electrode 62 and the connection tabs 36, 36' is not drawn, in order to render the inner construction visible.

Figure 45:
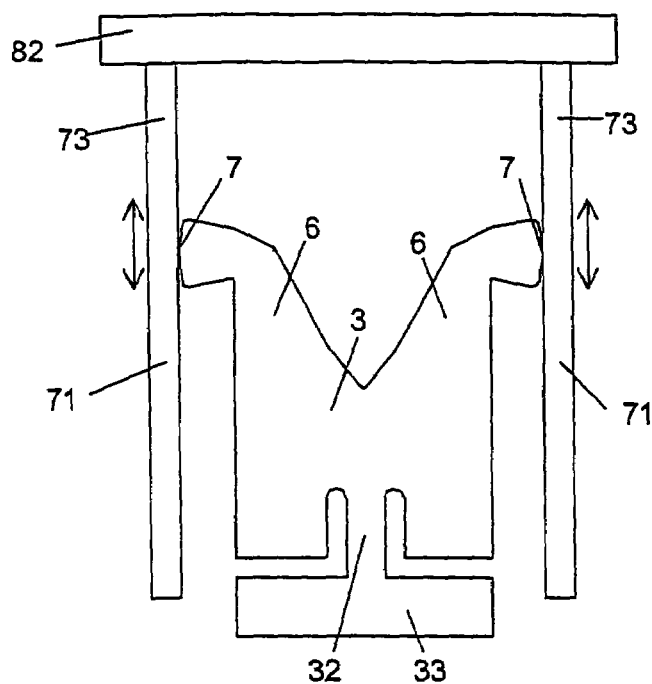
FIG. 45-46 drives with outer runners.

FIG. 45 schematically shows a further embodiment of the invention, in which the contact regions 7 act from the outside. The mounting 32 and the excitation means 4 are basically designed as with the preceding embodiments, and may be varied accordingly. Also several equally formed resonators 3 may be arranged parallel to one another. The oscillations effective with regard to drive here too preferably mainly run in planes parallel to the one or the several resonators 3. However the contact regions 7 are directed outwardly instead of inwardly. It is possible with this, for the passive element 1 to enclose the active element 2 in particular also in the region of the excitation means 4 and the mounting 32. A longer travel path of the passive element 1 may be achieved by way of this.

The passive element 1 is resilient per se and preferably is also resiliently arranged with respect to the active element 2. For this, the contact elements 71 themselves may be designed in a resilient manner over the whole length, or only have one resilient region corresponding to a contact arm 73, and/or a part of the driven body 82 which connects the contact elements 71, is designed in resilient manner.

Figure 46:
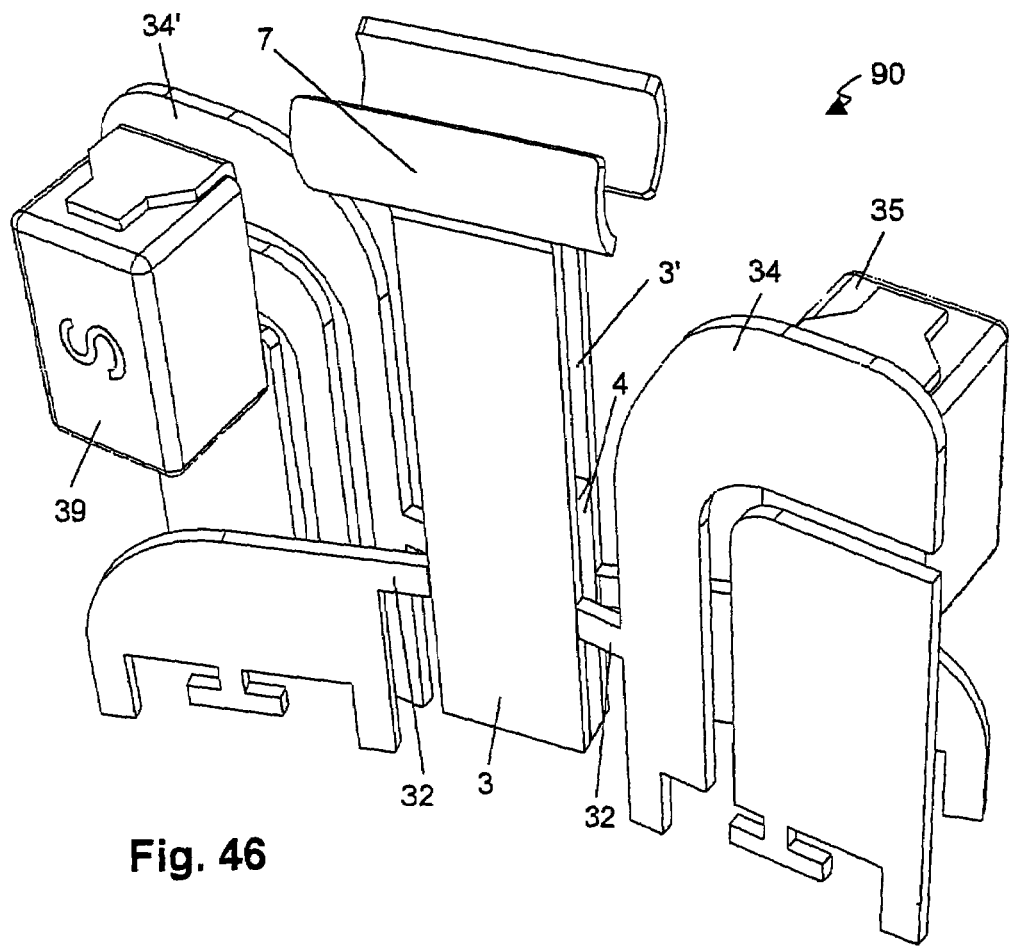

FIG. 46 shows an active part module of a further embodiment of the invention, in which the contact regions 7 act towards the outside. Here too, the resonator sheet metal parts 37, 37' as electrodes of a piezoelement 4 are arranged on this and run parallel to the piezo-surface. The oscillations effective for the drive however run mainly in planes perpendicular to the sheet metal plane. The mounting of the resonators 3, 3' is effected on both sides in the middle of the piezoelement 4, perpendicular to the longitudinal axis of the resonators 3, 3', and is likewise electrically conductive. The mounting in each case leads to a contacting tab 34 which is integrally formed as one piece. With the use of a single piezoelement 4 without an intermediate electrode, the two resonators 3, 3' are situated at a different electrical potential, which is why the two parts of the passive element 1 which come into contact with the resonators, are electrically insulated from one another. The passive element 1 is not drown in here; it encompasses the contact regions 7 from the outside. Apart from the coil 35, the active part module 90 also comprises a sensor 39 which is electrically connected to one of the contacting tabs 34, 34' as well as further connections. The sensor serves for the measurement of the position of the (non drawn) driven body 82, for example according to an optical, capacitive or inductive etc. working principle.

Figure 47:
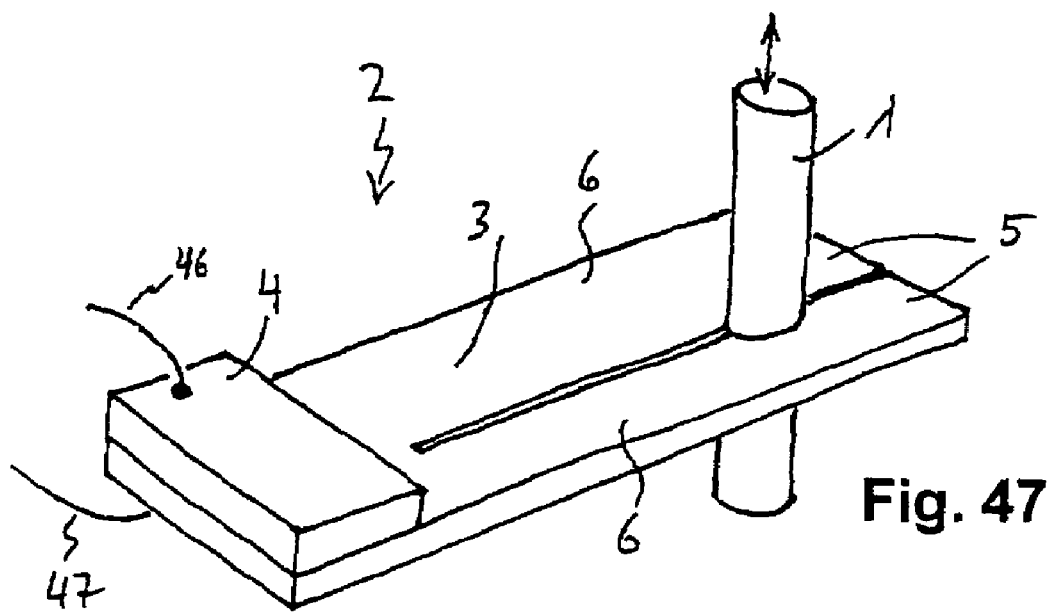
FIGS. 47-48 further embodiments of drives according to the invention.

FIG. 47 shows a further embodiment of the invention in which the resonator 3 consists of a slotted, flat sheet metal part. The slot separates two parallel, for example essentially rectangular arms 6, between which the passive element 1 is clamped. The arms 6 in each case at one location comprise a widening of the slot which corresponds to the cross sectional shape of the passive element 1, for accommodating the passive element 1. The contact regions 7 are formed on this widening. The movement of the passive element 1 is linear and/or rotatory, along an axis or about an axis which preferably runs perpendicular to the plane of the arms 6.

Figure 48:
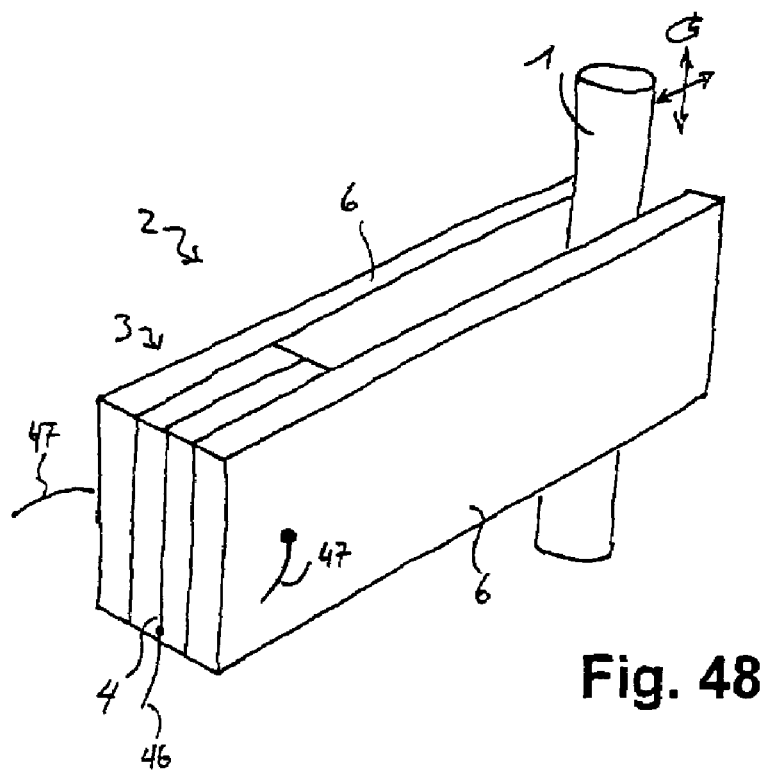

FIG. 48 shows a further embodiment of the invention, in which the resonator 3 comprises two separate arms 6 which in each case consist merely of a flat, unbent, preferably rectangular piece. The connection region 10 consists of the excitation means 4, for example a piezoelement of one or more piezocrystals which form a parallelepiped stack. The arms 6 are fastened on oppositely lying, parallel surfaces of the piezoelement, and extend parallel to one another in the same direction. The passive element 1 at the free ends is arranged between the arms 6. The passive element 1 in the figure is drawn as a cylinder of rotation, but may also have another cylindrical or prismatic shape, and may also be a flat plate which is clamped between the arms 6. The movement of the passive element 1 is parallel to the plane of the arms 6, and preferably perpendicular to the direction in which the arms extend, seen from the connection region 10. It may however also run parallel or at an angle to this direction. Also only a single arm 6 may be present in another variant.

The passive element 1 with the embodiments according to the FIGS. 47 and 48 is alternatively also a disk or a ring, and rotatably mounted, projects with its periphery between the arms 6. With this, a simple rotatory drive may also be realised in a simpler manner.

The piezoelements in the embodiment of the invention according to FIGS. 35 to 47 are preferably operated in the d31 mode.

We claim:

1. A drive unit comprising an active element which moves with respect to a passive element, wherein the active element comprises a resonator and at least one excitation means for exciting oscillations of the resonator, the resonator comprises contact regions for exerting forces onto the passive element, and the active element may be driven with respect to the passive element by way of oscillating movements of the contact regions, wherein the resonator comprises at least two arms, and the at least two arms, extending from a connection region of the resonator, are formed on the same side of the resonator, in each case the contact regions are formed at the outer ends of the arms, the contact regions are movable towards one another or away from one another by way of oscillating movements of the arm pair, and thereby a relative movement of the passive element with respect to the active element may be effected.

2. A drive unit according to claim 1, wherein the at least one arm pair is formed in an essentially symmetrical manner, and the contact regions of an arm pair are opposite one another in a symmetrical manner with respect to the arm pair.

3. A drive unit according to claim 1, wherein the contact regions of an arm pair and the passive element exert biasing forces opposing one another when in an idle condition.

4. A drive unit according to claim 3, wherein the arms of an arm pair enclose the passive element, and the contact regions in the idle condition in each case exert a force inwardly onto the passive element.

5. A drive unit according to claim 3, wherein the passive element encloses the arms of an arm pair, and the contact regions in the idle condition in each case exert a force to the outside onto the passive element.

6. A drive unit according to claim 1, wherein in an operating condition, in a plane running orthogonally to a movement axis, forces acting counter to one another may be exerted by the contact regions onto the passive element.

7. A drive unit according to claim 1, wherein the drive unit forms a linear drive.

8. A drive unit according to claim 1, wherein
the resonator comprises at least one flat section, the at least one excitation means is attached on the at least one flat section,
the at least one excitation means according to its planarity defines a plane of the at least one excitation means,
the arms are likewise formed in a two-dimensional manner, and the surface of the arms runs essentially parallel to the flat section and to the excitation means.

9. A drive unit according to claim 1, wherein
the resonator comprises at least one flat section,
the at least one excitation means is attached on the at least one flat section,
the at least one excitation means according to its planarity defines a plane of the at least one excitation means,
drive-effective components of a movement of individual material points of the contact regions run essentially parallel to the flat section and to the excitation means.

10. A drive unit according to claim 1, wherein
the resonator comprises at least one flat section,
the at least one excitation means is attached on the at least one flat section,
the at least one excitation means according to its planarity defines a plane of the at least one excitation means,
drive-effective components of a movement of individual material points of the contact regions run at an angle, in particular perpendicularly, to a plane of the flat section or of the excitation means.

11. A drive unit according to claim 1, wherein the resonator is formed of a single flat or regionally arcuate part with essentially a constant thickness.

12. The drive unit of claim 11, wherein the at least two arms of an arm pair are connected by a connecting region and the two arms extend from the connecting region in the same direction, each arm tapering off towards a bend region, then turning at the bend region towards the other arm, and then each arm increasing in width towards the contact region.

13. A drive unit according to claim 1, wherein the passive element and the active element are resiliently connected to one another via a base body connected to the active element and a driven body connected to the passive element and movable with respect to the base body.

14. A drive unit according to claim 13, wherein the active element is resiliently connected to the base body via a mounting, arid this resilient mounting is formed with the resonator as one piece.

15. A drive unit according to claim 14, wherein an excitation means is connected to the resonator via a connection surface, and the resilient mounting leads at least approximately to the middle of the connection surface.

16. A drive unit according to claim 15, wherein the resilient mounting consists of a section of a resonator sheet metal part, which at least approximately in the middle of the connection surface is bent out of the plane of the resonator, and leads to a base element for fastening on the base body.

17. A drive unit according to claim 14, wherein an excitation means is rectangular and is connected to the resonator via a rectangular connection surface, and at least one resilient mounting, proceeding from a region which lies at least approximately in the middle of a side of the rectangular connection surface, leads to a base element for fastening on the base body.

18. A drive unit according to claim 1, wherein the passive element is designed resilient per se.

19. A drive unit according to claim 18, wherein the passive element with respect to a movement in the region of the contact regions within the plane of the resonator and essentially perpendicular to the movement axis has a spring constant which is over 100 times smaller than the resonator.

20. A drive unit according to claim 19, wherein the spring constant is over 1,000 times smaller than the resonator.

21. A drive unit according to claim 18, wherein the passive element is designed as one piece.

22. A drive unit according to claim 1, wherein the passive element comprises several parts, and comprises at least two contact elements for transmitting drive forces from the contact regions onto a driven body, as well as at least one spring element which presses the contact elements in opposite directions against the contact regions.

23. A drive unit according to claim 1, wherein the passive element is resiliently connected to the driven body, and this resilient connection is formed as one piece with a contact plate of the passive element for accommodating drive forces.

24. A drive unit according to claim 23, wherein the resilient connection is rigid in a direction for transmitting drive forces, and is compliant in directions orthogonal thereto.

25. A drive unit according to claim 24, comprising means for limiting movements of the resilient connection for avoiding damage with impacts.

26. A drive unit according to claim 1, wherein the resonator comprises at least two resonators with at least two arm pairs which are arranged next to one another, parallel to one another and which act on the same passive element.

27. A drive element according to claim 26, further comprising at least one flat excitation means which is arranged between the at least two resonators arranged parallel to one another, for excitation of oscillations of the two resonators.

28. A drive unit according to claim 27, wherein the resonator is connected via an electrically conductive mounting for the electrical contacting of the excitation means to at least one base element, and the conductive mounting and the resonator are designed as one piece.

29. A drive unit according to claim 27, further comprising at least one intermediate electrode for the electrical contacting of the excitation means, wherein at least two excitation means are arranged between in each case two of the resonators, and an intermediate electrode is arranged in each case between two excitation means.

30. A drive unit according to claim 26, wherein the passive element comprises an electrically conductive material and the at least two resonators are connected to one another in an electrically conductive manner.

31. A drive unit according to claim 30, wherein a base element of sheet metal is allocated to each of two of the resonators, and at least one of the base elements is bent towards the other base element for the electrical contacting of this.

32. A drive unit according to claim 26, wherein the passive element comprises an electrically insulating material and the at least two resonators are electrically insulated from one another.

33. A drive unit according to claim 26, wherein the passive element comprises two contact plates, wherein each of the contact plates may be driven by contact regions of arms lying next to one another.

34. A drive unit according to claim 33, wherein the two contact plates are pressed against the contact regions by a spring element, and the contact plates are twistable by the spring element for compensating inaccuracies.

35. A drive unit according to claim 1, wherein the relative movement may be effected by oscillating movements of the arm pair according to a fundamental oscillation mode of the arms, wherein the fundamental oscillation mode has the lowest frequency of the different oscillation modes of the active element.

36. A drive unit according to claim 35, wherein a region in each case of one arm is designed as an integrated spring region.

37. A drive unit according to claim 36, wherein the resonator is of one piece.

38. A drive unit according to claim 36, wherein the resonator is formed of one or more bent sheet metal parts.

39. A drive unit according to claim 38, wherein spring regions are formed by bending locations of the bent sheet metal parts.

40. A drive unit according to claim 35, wherein one arm in each case comprises a flat section between the spring region and the contact region, this flat section is symmetrical per se, and the contact region is formed asymmetrically with respect to this flat section.

41. A drive unit according to claim 40, wherein the flat section is a plane, and an asymmetrically formed-out region is formed perpendicularly to this plane at the end of the respective arm.

42. A drive unit according to claim 40, wherein the flat section is a plane, and an asymmetrically formed-out region is formed within this plane at the end of the respective arm.

43. A drive unit according to claim 40, wherein the flat section of the two arms of an arm pair run essentially parallel to one another.

44. A drive unit according to claim 1, wherein
the resonator comprises at least one flat section,
the at least one excitation means is attached on the at least one flat section,
the at least one excitation means according to its planarity defines a plane of the at least one excitation means,
the resonator has a fundamental oscillation mode, and in this fundamental oscillation mode, individual material points of the contact regions move in each case in corresponding, essentially parallel fundamental oscillation planes, and
the fundamental oscillation planes run at an angle to the plane of the at least one excitation means.

45. A drive unit according to claim 44, wherein the fundamental oscillation planes and the plane of the at least one excitation means are essentially perpendicular to one another.

46. A drive unit according to claim 44, wherein the resonator comprises further plane sections which are arranged essentially perpendicularly to the fundamental oscillation planes.

47. A drive unit according to claim 1, wherein an excitation means is attached on an arm on a flat section, and is parallel to the flat section.

48. A drive unit according to claim 47, wherein the excitation means attached on an arm is one of
a piezoelement which is polarised perpendicular to the plane of the excitation means or of the corresponding flat section and which comprises electrical connections, in order to be operated in the d31-mode, or
a piezoelement which is polarised parallel to the plane of the excitation means or of the corresponding flat section and which comprises electrical connections, in order to be operated in the d33-mode,
a piezoelement which may be operated in the d15-mode and which with the surface of the piezoelement lying opposite the respective arm, is fastened on a holding body,
a body of magnetostrictive material which is designed for exciting an oscillation of the arm 6, in particular by way of extension or shortening within a plane parallel to that of the respective flat section, and wherein the drive unit comprises at least one coil for producing a magnetic field in the region of the excitation means.

49. A drive unit according to claim 1, wherein the at least one excitation means is arranged on a connection region of the resonator, which connects the at least two arms of an arm pair.

50. A drive unit according to claim 1, further comprising at least two arm pairs which point in opposite directions and are twisted relative to one another about a movement axis.

51. A drive unit according to claim 1, further comprising at least two arms pairs which point in the same direction and are twisted relative to one another about a movement axis.

52. A drive unit according to claim 1, further comprising an opening arranged on a connection region connecting the at least two arms of an arm pair, through which the passive element is guided.

53. A drive unit according to claim 1, wherein the passive element is cylinder-shaped, and the cylinder axis coincides essentially with a symmetry axis of the at least one arm pair.

54. A drive unit according to claim 53, wherein the passive element is one of a rod with an essentially round cross section, a rod with an essentially rectangular cross section, and a tube.

55. A drive unit according to claim 1, wherein the passive element comprises a rotationcylinder-shaped body which is arranged between the at least one arm pair and whose cylinder axis runs perpendicular to a symmetry axis of the at least one arm pair.

56. A drive unit according to claim 1, wherein the passive element comprises two rotationcylinder-shaped bodies, which are arranged between the at least one arm pair, and whose cylinder axes run perpendicularly to a symmetry axis of the at least one arm pair, and wherein in each case one of the two bodies in each case contacts one of the arms of the at least one arm pair, and the two rotation-cylinder-shaped bodies are pressed against one another by these arms and are rotatable with opposite rotational directions.

57. A drive unit according to claim 1, wherein the arms are flat and plane, or unbent, and the arms are fastened on oppositely lying parallel surfaces of the excitation means, extend parallel to one another in the same direction, wherein the passive element is arranged between the arms at the free ends.

58. A method for manufacturing a part module for a drive unit as defined by claim 1, comprising the steps of applying at least the following parts on one another:
a first resonator
a carrier element;
a first piezoplate
optionally, an intermediate electrode and of a second piezoplate;
a second resonator;
wherein an electrically conductive adhesive is brought at least regionally between the parts applied on one another, in each case between two steps.

59. A method according to claim 58, further comprising the step of:
pressing together the mentioned parts and curing of the adhesive by way of increasing its temperature.

60. A method according to claim 59, further comprising the steps of:
measuring characteristics of the previously assembled arrangement;
selecting a coil in accordance with results of the measurement;
connecting a coil to a contacting tab of one of the resonators.

61. A method for manufacturing a part module for a drive unit according to claim 1, comprising the steps of:
- punching a first resonator with a mounting, a base element as well as a first contacting tab out of a punch strip, wherein a connection to the punch strip remains;
- applying at least the following parts onto one another and connecting them:
  - a carrier element of electrically insulating material;
  - an excitation means which electrically contacts the first resonator;
  - an electrode or a second resonator, wherein the mentioned components are applied onto the first resonator conveyed by way of the punching strip.

62. A positioning unit for positioning an optical element, comprising a base body and a holder displaceable thereto, said holder carrying the optical element, wherein the positioning unit comprises a drive unit according to claim 1.

63. The drive unit of claim 1, wherein the active element comprises a resilient mounting, and the resilient mounting couples to the resonator at a location which lies on a longitudinal axis of symmetry of the resonator.

64. The drive unit of claim 1, wherein the active element comprises a resilient mounting, the resonator further comprises a slit and the resilient mounting extends along the slit and couples to the resonator at an inner end of the slit.

65. The drive unit of claim 64, wherein the slit traverses along a longitudinal axis of the resonator.

66. The drive unit of claim 1, wherein the at least two arms of an arm pair are connected by a connecting region and the two arms extend from the connecting region in the same direction, each arm tapering off towards a bend region, then turning at the bend region towards the other arm, and then each arm increasing in width towards the contact region.

67. A drive unit according to claim 1, wherein the at least two arms comprises a pair of arms.

68. A drive unit comprising an active element which moves with respect to a passive element, wherein the active element comprises a resonator and at least one excitation means for exciting oscillations of the resonator, the resonator comprises contact regions for exerting forces onto the passive element, and the active element may be driven with respect to the passive element by way of oscillating movements of the contact regions, wherein the resonator comprises at least two arms, and the at least two arms, extending from a connection region of the resonator, are formed on the same side of the resonator, in each case the contact regions are formed at the outer ends of the arms, the contact regions are movable towards one another or away from one another by way of oscillating movements of the arm pair, and thereby a relative movement of the passive element with respect to the active element may be effected,
- wherein the resonator is formed of a single flat or regionally arcuate part with essentially a constant thickness,
- wherein the active element comprises a resilient mounting, the resonator comprises a slit and the mounting extends along the slit and couples to the resonator at an inner end of the slit,
- and wherein the slit traverses along a longitudinal axis of the resonator.

69. A drive unit according to claim 68, wherein the at least two arms comprises a pair of arms.

* * * * *